(12) United States Patent
Paul

(10) Patent No.: US 12,449,140 B2
(45) Date of Patent: Oct. 21, 2025

(54) SECURED MOUNTING FRAME FOR AN AIR CONDITIONING UNIT AND DEVICE FOR SECURING A WINDOW

(71) Applicant: Velma Concetta Paul, Boston, MA (US)

(72) Inventor: Velma Concetta Paul, Boston, MA (US)

( * ) Notice: Subject to any disclaimer, the term of this patent is extended or adjusted under 35 U.S.C. 154(b) by 0 days.

(21) Appl. No.: 18/661,402

(22) Filed: May 10, 2024

(65) Prior Publication Data

US 2024/0295331 A1 Sep. 5, 2024

Related U.S. Application Data

(62) Division of application No. 17/554,705, filed on Dec. 17, 2021, now Pat. No. 12,007,126.

(60) Provisional application No. 63/127,927, filed on Dec. 18, 2020.

(51) Int. Cl.
*F24F 1/031* (2019.01)

(52) U.S. Cl.
CPC ................................. *F24F 1/031* (2019.02)

(58) Field of Classification Search
CPC ........................................................ F24F 1/031
USPC ............................................................ 248/674
See application file for complete search history.

(56) References Cited

U.S. PATENT DOCUMENTS

| | | | |
|---|---|---|---|
| 5,967,478 A * | 10/1999 | Tynes | A47B 45/00 248/208 |
| 9,938,044 B2 * | 4/2018 | Gamboa | B65D 85/68 |
| 10,655,889 B2 | 5/2020 | Tully | |
| 10,876,760 B2 | 12/2020 | Paul | |
| 11,725,834 B2 | 8/2023 | Biasotti | |
| 2013/0153744 A1 * | 6/2013 | Jin | F24F 13/32 248/670 |
| 2017/0297768 A1 | 10/2017 | Gamboa | |
| 2018/0313575 A1 | 11/2018 | Paul | |

* cited by examiner

*Primary Examiner* — Anita M King
(74) *Attorney, Agent, or Firm* — Wilmer Cutler Pickering Hale and Dorr LLP

(57) ABSTRACT

Mounting frames for an air conditioning unit that secure the unit in a window while allowing portions of the frame and the air conditioning unit to be pivoted in and out of the window opening for safe and timely egress from the window, if needed. In addition, described herein is a device or securing a window optionally having an air condition unit installed wherein the securing device prevents unauthorized opening of the window from the outside.

15 Claims, 14 Drawing Sheets

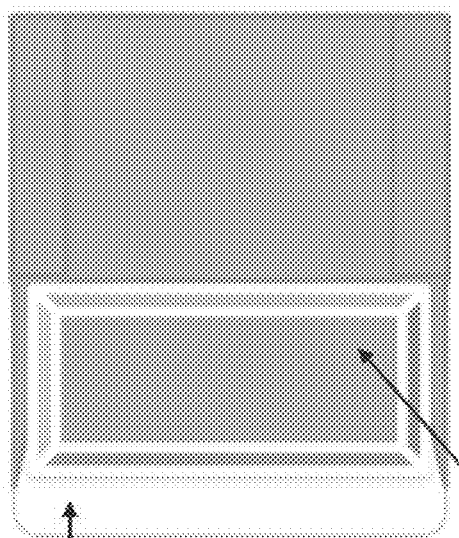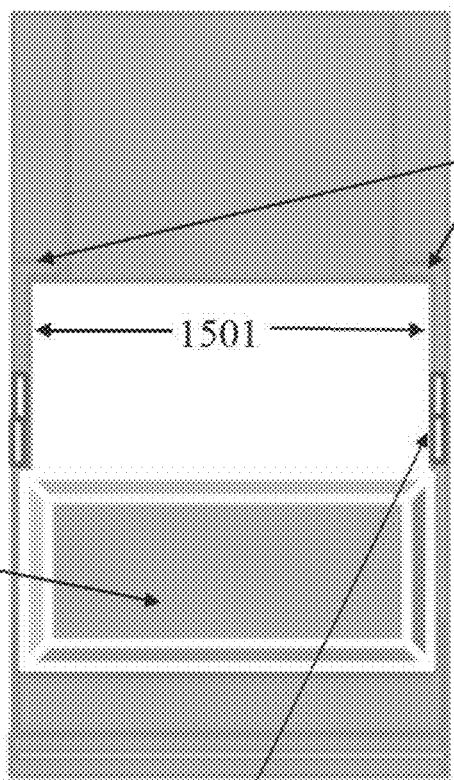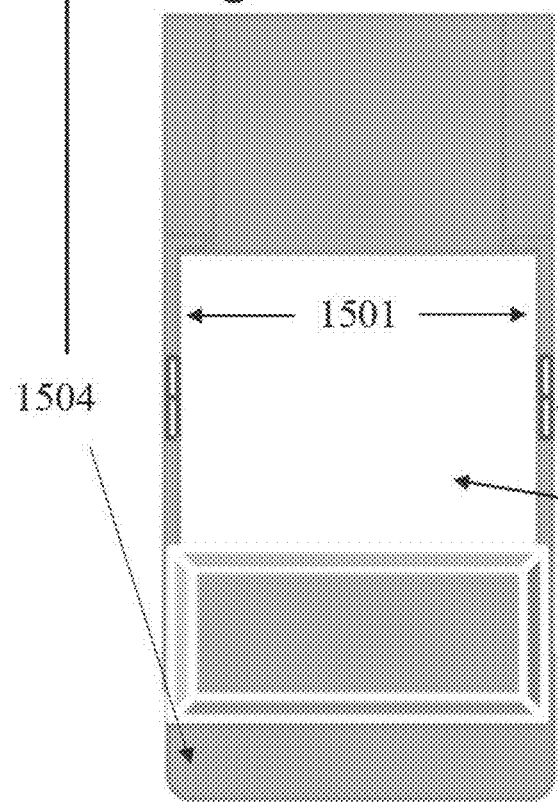
Figs. 15A-C

SECURED MOUNTING FRAME FOR AN AIR CONDITIONING UNIT AND DEVICE FOR SECURING A WINDOW

This application is a divisional of U.S. patent application Ser. No. 17/554,705 filed on Dec. 17, 2021, which claims priority to U.S. Provisional App. No. 63/127,927 filed on Dec. 18, 2020, entitled "Secured Mounting Frame For An Air Conditioning Unit And Device For Securing A Window," which are incorporated by reference herein, in their entirety.

BACKGROUND OF THE INVENTION

Window air conditioner ("AC") units are an essential appliance for many buildings, including homes and apartments, throughout the world, in particular in inner city pre-war apartment buildings that lack HVAC systems. Traditionally, window air conditioner units are boxy and heavy appliances that can be difficult to install, as well as a danger if installed incorrectly. The cantilever design of window air conditioner units makes them back heavy, which allows them to fall backward out of the window frame and possibly on to pedestrians or property below the window. Additionally, window air conditioner units can be pulled out of the window frame or kicked in from outside the building allowing access to the building, including apartments and homes, by burglars. For these reasons many people fasten window air conditioner units to the window frame using screws or other fasteners, which are often permanent or difficult to remove in a timely manner. However, fixing the unit to the window frame creates a separate hazard of removing the unit during emergency situations. In addition, installation of window AC units requires the window to be left ajar, at least partially open, and often unsecured, which can allow for the window to be easily opened from the exterior of the building again presenting a security concern and allowing access to the building through the unsecured window. Examples of mounting frames for securing an AC unit in a window frame are described in U.S. Patent Application Publication No. 2018/0313575, the disclosure of which is incorporated herein by reference in its entirety. There is a need for AC unit mounting frames that allow for secure mounting of the unit in a window but also allow safe and fast egress through the window in time of emergency without having to remove the AC unit and/or mounting frame from the window. In addition, there is a need for devices to secure windows, optionally having an AC unit installed, from unauthorized opening from the outside. Described herein are devices that meet these needs.

BRIEF SUMMARY OF THE INVENTION

A device for mounting and securing an air conditioner unit is described. In certain embodiments, the air conditioner unit is a window air conditioner unit. In some embodiments, the device comprises a mounting frame for an air conditioning unit, the mounting frame comprising a front-facing flange that further comprises a top member, a bottom member, and two side members that form an opening in the front-facing flange that is configured to receive a window air conditioning unit. In some embodiments, the opening in the front-facing flange is rectangular. In certain embodiments, the mounting frame further comprises a rear security platform coupled to the front-facing flange, wherein, when the mounting frame is installed into a window opening, the front-facing flange is configured to receive the air conditioning unit through the opening and the rear security platform supports the air conditioning unit. In some embodiments, the mounting frame further comprises a front security platform coupled to the bottom member of the front-facing flange, wherein, when the mounting frame is installed into a window opening, the front-facing flange is configured to receive the air conditioning unit through the opening and the front security platform supports the air conditioning unit. In certain embodiments, the mounting frame further comprises both rear and front security platforms, each of which is coupled to the bottom member of the front-facing flange. In some embodiments, the rear security platform and/or front security platform comprise raised edges to allow the rear security platform and/or front security platform to act as a cradle and to prevent the air conditioning unit from sliding off the rear and/or front security platform laterally and/or longitudinally. In certain embodiments, the first side member of the front-facing flange is coupled to a first wall plate via one or more hinges and the second side member of the front-facing flange is configured to reversibly engage a second wall plate to secure the mounting frame to the second wall plate when the second side member is reversibly engaged with the second wall plate. In certain embodiments, the first wall plate and the second wall plate are capable of being secured to one or more interior or exterior structures of a building adjacent to the window opening in which the air conditioning unit is installed. In some embodiments, the first and second wall plates comprise holes for receiving fasteners for securing the first and second wall plates to the one or more interior or exterior structures. In certain embodiments, the one or more interior or exterior structures are interior or exterior walls adjacent to the window opening in which the air conditioning unit is installed.

In some embodiments, the one or more hinges that couple the first side member to the first wall plate are detachable hinges. In certain embodiments, the one or more hinges that couple the first side member to the first wall plate comprise a removable pin, wherein when the pin is engaged in the one or more hinges, the one or more hinges allows the mounting frame to pivot in relation to the first wall plate. In some embodiments, the first side member of the front-facing flange is coupled to a first wall plate via one or more hinges as described above and is configured to allow the front-facing flange to pivot inward or toward the inside of the window opening in relation to the first wall plate. In certain embodiments, the first side member of the front-facing flange is coupled to a first wall plate via one or more hinges as described above and is configured to allow the front-facing flange to pivot outward or toward the outside of the window opening in relation to the first wall plate.

In certain embodiments, the second side member of the front-facing flange reversibly engages with the second wall plate via one or more latches. In some embodiments, the second side member of the front-facing flange reversibly engages with the second wall plate via one or more eyelets and one or more locking pins, wherein each of the second side member of the front-facing flange and the second wall plate comprises one or more eyelets configured to receive the one or more locking pins. In certain embodiments, the second side member of the front-facing flange reversibly engages with the second wall plate via one or more reversible snap locks. In some embodiments, the second side member of the front-facing flange reversibly engages with the second wall plate via one or more hooks.

In some embodiments, the device comprises a mounting frame for an air conditioning unit that is configured to be installed in a window opening, the mounting frame comprising a top member, a bottom member, and two side members that form an opening configured to receive a front-facing flange, and the device further comprises a front-facing flange that comprises a top member, a bottom member, and two side members that form an opening in the front-facing flange that is configured to receive a window air conditioning unit. In some embodiments, the opening in the frame and/or the opening in the front-facing flange is rectangular. In certain embodiments, a side member of the front-facing flange is configured to reversibly engage a side member of the mounting frame to secure the front-facing flange to the mounting frame when the side member of the front-facing flange is reversibly engaged with the side member of the mounting frame. In certain embodiments, the side member of the front-facing flange reversibly engages with the side member of the mounting plate via one or more latches. In some embodiments, the side member of the front-facing flange reversibly engages with the side member of the mounting frame via one or more eyelets and one or more locking pins, wherein each of the side member of the front-facing flange and the side member of the mounting frame comprises one or more eyelets configured to receive the one or more locking pins. In certain embodiments, the side member of the front-facing flange reversibly engages with a side member of the mounting frame via one or more reversible snap locks. In some embodiments, the side member of the front-facing flange reversibly engages with a side member of the mounting frame via one or more hooks.

In certain embodiments, the front-facing flange further comprises a rear security platform coupled to the bottom member of the front-facing flange. In some embodiments, the front-facing flange further comprises a front security platform coupled to the bottom member of the front-facing flange. In certain embodiments, the front-facing flange further comprises both rear and front security platforms, each of which is coupled to the bottom member of the front-facing flange. In some embodiments, the rear security platform and/or front security platform comprise raised edges to allow the rear security platform and/or front security platform to act as a cradle and to prevent the air conditioning unit from sliding off the rear and/or front security platform laterally and/or longitudinally.

In some embodiments, the mounting frame comprises a rear security platform coupled to the bottom member of the mounting frame. In certain embodiments, when the mounting frame is installed into a window opening and the front-facing flange is inserted or received into the opening in the mounting frame, the front-facing flange is configured to receive the air conditioning unit through the opening in the front-facing flange and the rear security platform and/or front security platform coupled to the bottom member of the front-facing flange supports the air conditioning unit. In some embodiments, when the mounting frame is installed into a window opening and the front-facing flange is inserted or received into the opening in the frame, the front-facing flange is configured to receive the air conditioning unit through the opening in the front-facing flange and the rear security platform coupled to the bottom member of the mounting frame supports the air conditioning unit. In certain embodiments, when the mounting frame is installed into a window opening and the front-facing flange is inserted or received into the opening in the frame, the front-facing flange is configured to receive the air conditioning unit through the opening in the front-facing flange and both the rear security platform coupled to the bottom member of the front-facing flange and the rear security platform coupled to the bottom member of the mounting frame support the air conditioning unit.

In certain embodiments, one or more of the top member, bottom member, and side members of the mounting frame is attached to the window frame and/or lower sash of the window. In some embodiments, the mounting frame is attached to the interior-facing side of the window frame and/or interior-facing side of the lower sash of the window. In certain embodiments, the mounting frame is attached to the exterior-facing side of the window frame and/or the exterior-facing side of the lower sash of the window. In some embodiments, the mounting frame rests in the window opening and is not attached to the window frame and/or lower sash of the window. In some embodiments, one of the side members of the front-facing flange is coupled to one of the side members of the mounting frame via one or more hinges. In certain embodiments, the top member of the front-facing flange is coupled to the top member of the mounting frame via one or more hinges. In some embodiments, the bottom member of the front-facing flange is coupled to the bottom member of the mounting frame via one or more hinges. In certain embodiments, the one or more hinges coupling the front-facing flange to the mounting frame are detachable hinges. In some embodiments, the one or more hinges comprise a removable pin. In certain embodiments, the one or more hinges allows the front-facing flange to pivot in relation to the frame to allow the front-facing flange to be received in and removed from the opening in the mounting frame. In certain embodiments, the front-facing flange is coupled to the mounting frame via one or more hinges as described above and configured to allow the front-facing flange to pivot inward or toward the inside of the window opening in relation to the mounting frame. In some embodiments, the front-facing flange is coupled to the mounting frame via one or more hinges as described and configured to allow the front-facing flange to pivot outward or toward the outside of the window opening in relation to the mounting frame.

In certain embodiments, the front-facing flange comprises one or more handles. In some embodiments, the top member of the front-facing flange comprises an L-shaped stability bar or a U-shaped stability bar. In certain embodiments, one or more components, for example arms, configured to prevent the air conditioning unit from sliding forward and out of the opening in the front-facing flange are coupled to one or more of the side members of the front-facing flange. In some embodiments, the one or more components configured to prevent the air conditioning unit from sliding forward and out of the opening in the front-facing flange are bars or arms. In certain embodiments, when two components configured to prevent the air conditioning unit from sliding forward and out of the opening in the front-facing flange are present, the components may be configured to have joints to allow the components to bend and form a fence around the front of the AC unit. In some embodiments, the components may be configured to reversibly couple to one another through a reversibly locking mechanism to secure the front of the air conditioning unit in the opening in the front-facing flange. In some embodiments, the one or more components configured to prevent the air conditioning unit from sliding forward and out of the opening in the front-facing flange are adjustable and may to be slid toward or away from the front-facing flange to accommodate different sizes of air conditioning units or different size areas between the front-facing flange and the front edge of the air conditioning unit.

In certain embodiments, one or more of the top member, bottom member, and side members of the front-facing flange include holes for receiving fasteners for securing the air conditioning unit to the front-facing flange. In some embodiments, one or more of the top member, bottom member, and side members of the front-facing flange include one or more hooks for securing the air conditioning unit to the front-facing flange. In some embodiments, the rear security platform and/or front security platform is coupled to the bottom member of the front-facing flange. In certain embodiments, the rear security platform and/or front security platform is coupled to the bottom member of the front-facing flange via a hinge, wherein in an open position, the rear security platform and/or front security platform is configured to receive the air conditioning unit, and in a closed position, the rear security platform and/or front security platform is configured to cover the opening in the front-facing flange. In some embodiments, the rear security platform and/or front security platform is configured to seal the opening in the front-facing flange when the rear security platform and/or front security platform is in the closed position. In certain embodiments, the rear security platform and/or front security platform is secured and maintained in the closed position by attaching the rear security platform and/or front security platform to one of the side members or top member of the front-facing flange via one or more hooks or other latching mechanism. In certain embodiments, the rear security platform and/or front security platform may be reversibly attached to an interior or exterior wall adjacent to the window frame when the mounting frame is pivoted out the opening in the frame to hold the front-facing flange in an open position and allow access to the opening in the window frame (e.g., for egress during an emergency). In some embodiments, the rear security platform and/or front security platform comprise a component, such as a bar brace, that is coupled to the platform and is configured to support the platform by forming a brace between the platform and the structure below the window opening. Those skilled in the art would understand that the bracing component can be a variety of shapes and sizes, including U-shaped, and can be made of a variety of materials, including plastic, wood, fiberglass, metal, a composite material, or a combination thereof. In some embodiments, the material for the bracing component is paintable.

In certain embodiments, the front-facing flange further comprises one or more expandable panels configured to be slid in or out to be near to or touching the air condition unit to allow filling any excess space in the opening in the front-facing flange when the air conditioning unit is installed in the opening in the front-facing flange. In some embodiments, the one or more expandable panels are configured to fold to be near to or touching the air condition unit to allow filling any excess space in the opening in the front-facing flange when the air conditioning unit is installed in the front-facing flange. In certain embodiments, the mounting frame, including the front-facing flange, is configured to accept expandable panels that may be provided with the window air conditioning unit.

In some embodiments the top and bottom members of the mounting frame and/or the top and bottom members of the front-facing flange are configured to be adjustable to allow the two side members of the mounting frame and/or the two side members of the front-facing flange to be slid toward or away from one another to allow the size of the opening in the mounting frame and/or the size of the opening in the front-facing flange to be adjusted to fit window openings of different sizes. In certain embodiments, the top and bottom members of the mounting frame and/or the top and bottom members of the front-facing flange comprise adjustable tubes. In some embodiments, the adjustable tubes are telescoping tubes. In certain embodiments, the adjustable tubes can be reversibly locked together at different lengths. In some embodiments, the adjustable tubes are reversibly locked at a desired length by one or more push button locks. In certain embodiments, the adjustable tubes are reversibly locked at a desired length by a quick release mechanism.

In some embodiments, the front-facing flange comprises a handle. In certain embodiments, the mounting device may comprise a front and/or rear security platform configured to be coupled to the front-facing flange to seal the opening in the front-facing flange. In some embodiments, the device may comprise panels configured to be coupled to the front-facing flange to seal any excess space in the opening in the front-facing flange when the air conditioning unit is installed. In certain embodiments, the front and/or rear security platform comprises a plurality of openings. Those skilled in the art would understand that the mounting frame can be a variety of shapes and sizes, and can be made of a variety of materials, including plastic, wood, fiberglass, metal, a composite material, or a combination thereof. In some embodiments, the material for the mounting frame is paintable.

In certain embodiments, the mounting frame further comprises one or more components for egress from a window or other opening in which the mounting frame may be inserted. In some embodiments, the one or more components for egress is configured such that, when the top member, bottom member, or one of the side members pivots inward or toward the inside of the window or other opening in relation to the mounting frame or wall plate by the one or more hinges, the one or more components for egress is capable of extending from the mounting frame toward the ground. In certain embodiments, the one or more components for egress is configured such that, when the top member, bottom member, or one of the side members pivots outward or toward the outside of the window or other opening in relation to the mounting frame or wall plate by the one or more hinges, the one or more components for egress is capable of extending out to the exterior of the building and toward the ground.

In some embodiments, the one or more components for egress is coupled to the rear and/or front security platform optionally coupled to the mounting frame. In certain embodiments, the one or more components for egress is coupled to the front-facing flange. In some embodiments, the one or more components for egress may be coupled to the mounting frame and/or security platform either through being permanently fitted (e.g., welded, one integral piece, fixed hinge, etc.) or by detachable means (e.g., a friction fit, screwed, removable hinge etc.). In some embodiments, the one or more components for egress may be removably attached to a plate on the windowsill by one or more attachable means (e.g., hooks).

In certain embodiments, the one or more components for egress comprises a ladder, slide, pole, rope, chain, cable or equivalent. In some embodiments, the one or more components for egress may be collapsible, and in certain embodiments, when in collapsed form, the one or more components for egress may be removably held to the device in collapsed form to prevent unintentional deployment. In some embodiments, the one or more components for egress is configured to reach one or more floors below the window opening. In certain embodiments, the one or more components for egress is configured to reach the ground outside the building or a point that allows safe access to the ground from the mounting frame. Those skilled in the art would understand that the length of the one or more components for egress may be adjusted as needed to reach the ground outside the building from the position of the mounting frame. In some embodiments, the one or more components for egress may comprise a means for assistance during egress. Such means for assistance may include handrails, handles, knobs, and/or means for reversibly securing oneself to the one or more components, such as a clip, buckle, carabiner, or equivalent. The one or more components for egress may be configured to have a weight support of up to 250 pounds, up to 300 pounds, up to 400 pounds, up to 600 pounds, up to 800 pounds, up to 1,000 pounds, up to 1,200 pounds, up to 1,400 pounds, up to 1,600 pounds, up to 1,800 pounds or up to 2000 pounds. In embodiments where the one or more components for egress is a ladder, each rung of the ladder may be configured to have a weight support of up to 250 pounds, up to 300 pounds, up to 400 pounds, up to 600 pounds, or up to 800 pounds.

The invention also provides for a method for installing the mounting frame into a window opening comprising inserting the mounting frame into a window opening, installing the air conditioning unit into the opening of the front-facing flange of the mounting frame and securing the air conditioning unit to the front-facing flange and optionally using expandable panels if there is excess space as needed. In certain embodiments, the method further comprises securing the mounting frame to an interior or exterior wall using locking plates and locking pins. Also provided is a method for removing the mounting device from a window, comprising removing the air conditioner from the opening of the front-facing flange, determining if the entire mounting frame is to be removed or just the air conditioner and optionally installing the security platform. In certain embodiments, the method comprises removing the locking pins from the locking plates on the interior or exterior wall and removing the mounting frame from the window. In certain embodiments, the method further comprises exiting the building through the window to the ground or a lower floor by utilizing one or more components for egress coupled to the device, as described herein.

A device for securing a window is also described. In certain embodiments, the window is a single hung window, and in some embodiments, the window is a double hung window. In certain embodiments, the window-securing device secures a window having an air conditioner unit installed in the window opening. In some embodiments, the window-securing device secures a window having a device for mounting and securing an air conditioner unit installed in the window frame or opening, including the mounting securing devices described herein. In some embodiments, the window securing device comprises a top member and two side members. In certain embodiments, the window securing device further optionally comprises a bottom member. In certain embodiments, the top member and two side members, and the optional bottom member of the device form a frame with an opening that fits over the front of a window air conditioning unit. In some embodiments, the top member and two side members, and the optional bottom member of the device form a frame that fits around at least a portion of a lower sash of a window.

In certain embodiments, the window securing device contacts at least a portion of a lower sash of the window and extends to and contacts a windowsill. In some embodiments, the window securing device contacts at least a portion of a lower sash of the window and extends to and contacts a windowsill of a window having a window air conditioning installed in an opening of the window. In certain embodiments, the lower sash of the window is in a partially opened position to accommodate a window air conditioning unit and in some embodiments the lower sash of the window is in a substantially or completely opened position to accommodate a window air conditioning unit.

In some embodiments, the top member and optional bottom member of the window securing device are configured to be adjustable to allow the two side members of the window securing device to be slid toward or away from one another to allow the width of the window securing device to be adjusted to fit windows of different sizes. In certain embodiments, the side members of the window securing device are configured to be adjustable to allow the top member and optional bottom member of the window securing device to be slid toward or away from one another to allow the height of the window securing device to be adjusted to fit windows of different sizes. In certain embodiments, one or more of the top member, optional bottom member, and side members of the window securing device comprise adjustable tubes. In some embodiments, the adjustable tubes are telescoping tubes. In certain embodiments, the adjustable tubes can be reversibly locked together at different lengths. In some embodiments, the adjustable tubes are reversibly locked at a desired length by one or more push button locks. In certain embodiments, the adjustable tubes are reversibly locked at a desired length using a quick release mechanism.

In some embodiments, the top member of the window securing device contacts the top rail of the lower sash of the window. In certain embodiments, the top member of the window securing device is L-shaped so a portion of the top member contacts the upward facing portion of the top rail of the lower sash of the window and a portion of the top member contacts the inward facing portion of the top rail of the lower sash of the window. In some embodiments, the top member of the window securing device rests on the upward facing portion of the top rail of the lower sash of the window. In some embodiments, the side members of the window securing device contact the inward facing portion of the stiles of the lower sash of the window. In certain embodiments, the optional bottom member of the window securing device contacts the windowsill. In some embodiments, the optional bottom member of the window securing device rests on the windowsill.

In certain embodiment, one or more of the top member, optional bottom member, and two side members of the window securing device are configured to be reversibly attached to the lower sash of the window. In some embodiments, one or more of the top member, optional bottom member, and side members of the window securing device comprises an adhesive that allows the one or more members to be reversibly attached to the lower sash of the window. In certain embodiments, one or more of the top member, optional bottom member, and side members of the window securing device comprises one or more holes for receiving a fastener (e.g., a screw) to allow the one or more members to be reversibly attached to the lower sash of the window.

In some embodiments, the top member of the window securing device comprises one or more openings for receiving one or more sash locks located on the top rail of the lower sash of the window. In certain embodiments, the one more openings in the top member of the window securing device is located in the portion of the top member that contacts the upward facing side of the top rail of the lower sash of the window. In some embodiments, the one or more openings in the top member of the window securing device is located in the portion of the top member that contacts the inward facing side of the top rail of the lower sash of the window. In some embodiments, the window comprises one sash lock and in other embodiments the window comprises multiple sash locks.

In some embodiments, at least a portion of one or both of the side members of the window securing device is configured in an L-shape so a portion of the side member contacts the inward facing portion of the stile of the lower sash of the window and a portion of the side member contacts the side jamb of the lower sash of the window. In certain embodiments, one or more side members of the device can be reversibly attached to a stile of the window. In some embodiments, one or more of the side members of the securing device is reversibly attached to a stile of the window through an adhesive, screw, or other fastener. In certain embodiments, one or more of the side members of the securing device is reversibly attached to a side jamb of the window frame through an adhesive, screw, or other fastener. Those skilled in the art would understand that the window securing device can be a variety of shapes and sizes, and can be made of a variety of materials, including plastic, wood, fiberglass, metal, a composite material, or a combination thereof. In some embodiments, the material for the window securing device is paintable.

In certain embodiments, the window securing device further comprises one or more security bars, each comprising a proximal and distal end, that secure the window and prevent the window from being further opened. In some embodiments, the securing bars prevent the lower sash of the window from being moved upward toward the head jamb of the window. In certain embodiments, the proximal end of the one or more security bars contacts the top member of the window securing device and the distal end of the one or more security bars contacts the head jamb of the window frame. In some embodiments, the proximal end of the one or more security bars contacts the top member of the window securing device and the distal end of the one or more security bars contacts the ceiling above the window frame. In certain embodiments the length of the one or more security bars is adjustable. In some embodiments, the one or more security bars are configured to be adjustable to allow the proximal end and the distal end of the bar to be slid toward or away from one another to allow the length of the bar to be adjusted. In certain embodiments, one or more of the security bars comprises adjustable tubes. In some embodiments, the adjustable tubes are telescoping tubes. In certain embodiments, the adjustable tubes can be reversibly locked together at different lengths. In some embodiments, the adjustable tubes are reversibly locked at a desired length by one or more push button locks. In certain embodiments, the adjustable tubes are reversibly locked at a desired length using a quick release mechanism.

In some embodiments, the proximal and/or distal ends of the one or more securing bars comprises a material that allows for the proximal and/or distal end to attach to a surface through a friction fit. In some embodiments, the proximal and/or distal ends of the one or more securing bars comprises rubber. In certain embodiments, the proximal end of the one or more securing bars is permanently attached to the top member of the securing device. In some embodiments, the proximal end of the one or more securing bars is welded or glued to the top member of the securing device. In certain embodiments, the proximal end of the one or more securing bars is attached to the top member of the securing device through a hinge, which hinge in some embodiments is a detachable hinge.

In certain embodiments, the proximal end of the one or more securing bars is reversibly attached to the top member of the window securing device. In some embodiments, the proximal end of the one or more securing bars comprises an adhesive that allows the proximal end to be reversibly attached to the top member of the window securing device. In certain embodiments, the proximal end of the one or more securing bars is reversibly attached to the top member of the window securing device through a screw or other fastener. In some embodiments, the distal end of the one or more securing bars is reversibly attached to the head jamb or other portion of the upper window frame. In some embodiments, the distal end of the one or more securing bars comprises an adhesive that allows the distal end to be reversibly attached to the head jamb or other portion of the upper window frame. In certain embodiments, the distal end of the one or more securing bars is reversibly attached to the head jamb or other portion of the upper window frame through a screw or other fastener. In some embodiments, the distal end of the one or more securing bars is reversibly attached to the ceiling above the window. In some embodiments, the distal end of the one or more securing bars comprises an adhesive that allows the distal end to be reversibly attached to the ceiling above the window. In certain embodiments, the distal end of the one or more securing bars is reversibly attached to the ceiling above the window through a screw or other fastener. The one or more securing bars may comprise one or more of plastic, wood, fiberglass, metal, or a composite material. In some embodiments, the material for the one of more securing bars is paintable.

In some embodiments, the front-facing flange further comprises one or more holes for receiving one or more components for securing the window that is configured to prevent the window from opening further when the component is inserted into the one or more holes. In certain embodiments, the component that is inserted into the holes for securing the window comprises a removable pin. In some embodiments, the component that is inserted into the holes for securing the window comprises a removable screw, hook, or latch. In some embodiments, the component for securing the window is affixed to the inward facing portion of the lower sash, including the window stiles (first or second side) or the top or bottom rails of the lower sash, by a connecting member. In certain embodiments, the connecting member comprises a flexible member such as cord, string, cable, chain, rope, twine, or line, or an inflexible member such as a rod, bar, or pole.

A securing mounting device and track system for an air conditioning unit is also described herein. In certain embodiments, the air conditioner unit is a window air conditioner unit. In some embodiments, the securing mounting device comprises one or more tracks coupled to a mounting component, with each of the one or more tracks comprising a sliding mechanism. In some embodiments, the securing mounting device further comprises a bottom platform. In certain embodiments, the bottom platform is capable of being inserted into at least a portion of a window frame of an open window, and it is configured such that, when the platform is inserted into at least a portion of the window frame, it may receive the air conditioning unit through the opening in the window. In certain embodiments, the securing mounting device may further comprise a security plate coupled to the windowsill, such that the bottom platform, when at least partially inserted into the window opening, rests on top of the security plate. In some embodiments, the security plate is coupled to the one or more tracks. In certain embodiments, the securing mounting device comprises a mounting frame with a top member, a bottom member, a first side member, and a second side member. In some embodiments, the mounting frame is capable of being installed into a window opening and the mounting frame comprises an opening that is configured to receive the air conditioning unit. In certain embodiments, the bottom platform of the securing mounting device is coupled to the bottom member of the mounting frame. In certain embodiments, the one or more tracks of the securing mounting device may couple with one or more side members of the mounting frame. In certain embodiments, the securing mounting device comprises one or more wall plates, wherein the one or more side plates may act as a side member to couple to the one or more tracks of the securing mounting device. In some embodiments, when the bottom platform of the securing mounting device is installed into at least a portion of the window opening, the bottom platform is capable of reversibly engaging with the sliding mechanism of the one or more tracks when the bottom platform is moved away from the window opening. In some embodiments, upon engaging with the one or more sliding mechanisms, the bottom platform is capable of moving down the one or more tracks of the securing mounting device and uncovering a portion or all of the window opening. In certain embodiments, when the bottom platform of the securing mounting device is engaged with the one or more tracks and is at the bottom of the one or more tracks, the bottom platform is capable of moving up the one or more tracks to cover, partially or entirely, the window opening. In certain embodiments, the bottom platform of the securing mounting device can be disengaged from the sliding mechanism on of the one or more tracks, allowing the bottom platform to be installed into at least a portion of the window opening. In some embodiments, one or more of tracks of the securing mounting device further comprises an eyelet and a removable pin, configured such that, when the pin is in the eyelet, the bottom platform is held in the window opening and is prevented from sliding along the one or more track. In certain embodiments, when the pin is removed from the eyelet, the bottom platform may be moved away from the window opening and reversibly engaged with the sliding mechanism on the one or more tracks, allowing the bottom platform to slide along the one or more tracks. In certain embodiments, the one or more tracks are positioned on the interior of the window. In some embodiments, the one or more tracks are positioned on the exterior of the window. In certain embodiments, the one or more tracks are configured so that, when the platform engages with the sliding mechanism of the one or more tracks, the platform is capable of moving down the one or more tracks toward the ground, thereby providing a means of egress from the window opening. In certain embodiments, the one or more tracks further comprise one or more locking mechanisms capable of reversibly locking the bottom platform in certain positions on the one or more tracks.

BRIEF DESCRIPTION OF THE DRAWINGS

FIGS. 15A-C are a front view of an exemplary embodiment of a securing mounting device and track system for an AC unit installed in a window opening in a closed (FIG. 15A), partially open (FIG. 15B), and fully open (FIG. 15C) configuration.

DETAILED DESCRIPTION OF THE INVENTION

Figure 1:
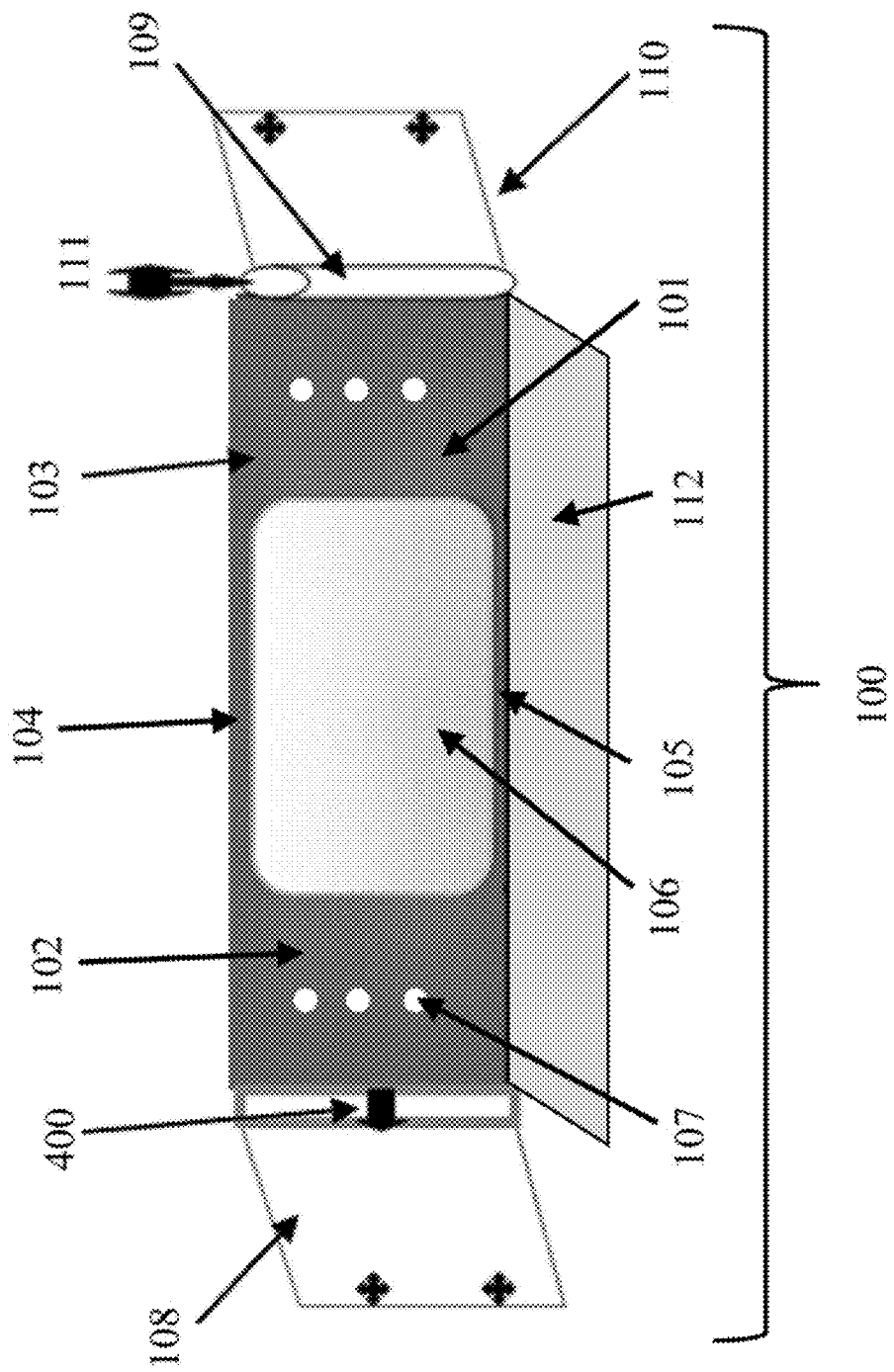
FIG. 1 is a front view of an exemplary embodiment of a mounting frame for an air conditioning unit according to various embodiments described herein.

Exemplary embodiments of a device for mounting and securing an air conditioning unit in a window opening may be further understood with reference to the drawings, in particular FIGS. 1-11, and 14, and the following description, wherein like elements in the drawings are referred to with the same reference numerals.

An exemplary device for mounting and securing a window air conditioning unit device is described in further detail herein. Specifically, the exemplary mounting and securing frame provides a safe and easy manner of installing and removing a window AC unit without the danger of the window AC unit falling out the window and further allowing the unit, once installed, to be temporarily and securely displaced from the window opening, while still being maintained in the mounting and securing frame to allow egress from the window in case of emergency. The exemplary mounting and securing frame may optionally have a component for egress coupled to the device or the windowsill, configured so that when the AC unit is temporarily displaced from the window opening, the component for egress may be extended out of the building toward the ground to facilitate egress. In addition, the exemplary mounting frame also provides a secure and reversible connection to an interior or exterior wall of the room in which the AC unit is installed so that the AC unit or mounting frame may not be pushed or kicked back into the room allowing access to the room by unwanted individuals.

FIG. 1 shows a front view of an exemplary embodiment of a securing mounting frame 100 for an AC unit according to various embodiments described herein. The components of the mounting frame 100 that will be described in greater detail below may be constructed of any type of material. Exemplary materials include plastics, wood, fiberglass, metals, alloys, composite, or any other rigid and sturdy materials. Different components of the mounting frame 100 may be constructed of the same or different materials.

The secured mounting frame 100 comprises a front-facing flange 101 that is comprised of two side members 102 and 103 (which may be joined to form one contiguous piece), a top member 104 and a bottom member 105. The members 102-105 of the front-facing flange 101 form an opening 106 for a window AC unit. The opening 106 is generally rectangular and the size may vary to fit common sizes of window AC units. However, it should be understood that the front-facing flange 101 and/or the opening 106 may comprise any shape that can fit within the dimensions of a window and which can accommodate window AC units. For example, while it is common that windows are generally rectangular or square, there are instances where windows are different shapes, e.g., circular, semicircular, etc. The front-facing flange 101 may be shaped to be received into these other shapes of windows. For example, if the window to receive the AC unit were circular, the front-facing flange 101 may be circular such that the mounting frame 100 may fit into the circular window. In such an example, those skilled in the art will understand there would be no side members 102 and 103, top member 104 or bottom member 105, but rather a rounded front-facing flange that comprised a generally circular perimeter member. The opening 106 that receives the AC unit in such an example could also be circular or it could also be rectangular. The opening 106 may be filled in with expandable panels (described in greater detail below) to fill in the area from the perimeter of the AC unit to the perimeter of the opening 106, regardless of the shape of the AC unit. These examples are provided to illustrate that while the exemplary front-facing flange 101 is shown as having a generally rectangular shape with a generally rectangular opening 106, the rectangular shape is not a requirement and the four members 102-105 are merely exemplary for the exemplary rectangular shape.

In the example of FIG. 1, the front-facing flange 101 would be the portion of the mounting frame 100 that would be visible to a person that is inside the room where the AC unit is mounted. As will be described in greater detail below, when the AC unit is mounted into the mounting frame 100 some or all of the front-facing flange 101 may be obscured by the AC unit, but for the purposes of this description, it may be considered that a person would see the front-facing flange 101 when the mounting frame 100 is inserted into the window, but before the AC unit is mounted within the mounting frame 100.

The top member 103 may further comprise a handle and an L- or U-shaped stability bar. The handle may be used to hold or carry the mounting frame 100 when installing or removing, temporarily, permanently, or long term for storage, the mounting frame 100. The stability bar may be used to help secure the mounting frame 100 to the window. For example, if the window is a typical double or single hung sash window (e.g., where there is one or two movable frames that form the window) and the mounting frame 100 is mounted within an opening of the window, one of the movable frames may be moved down to engage the stability bar so that the backside of the stability bar (in the case of the stability bar having the L-shape) rests against a front or back side of the window frame. In the case of the stability bar having a U-shaped stability bar, the window frame may be moved down to be inserted into the channel formed by the U-shape of the stability bar. Frame screw holes 107, which may be present in the top member 104 and/or may also be along the side members 102 and 103 and bottom member 105 may be used for fastening the AC unit to the mounting frame 100. That is the AC unit will not be fastened to the window itself, but rather the AC unit may be fastened to the mounting frame 100.

The side members 102 and 103 may also include hook holes to fasten the security platform 200 to the mounting frame. The hook holes (and corresponding hooks) may be used to secure the optional rear security platform 200 and/or optional front security platform 112 by connecting with the security platform hooks when it is in an upright position to fill partially or entirely the opening for the AC unit 106. The optional rear security platform 200 and/or optional front security platform 112 may be coupled, either permanently fitted (e.g., welded, one integral piece, fixed hinge, etc.) or by detachable means (e.g., a friction fit, screwed, removable hinge etc.) to the bottom member of the front-facing flange 105. One of the side members, for example 102, may also include a facing locking plate 400 that can be used to reversibly attach the mounting frame 100 to a wall plate 108 via a facing locking plate 400 on the wall plate 108, which wall plate 108 is attached to an interior or exterior wall of the structure in which the AC unit is disposed. The other side member, for example 103, may include a hinge 109, for example a detachable hinge, that couples the side member 103 to a wall plate 110 that is attached to an interior or exterior wall of the structure in which the AC unit is disposed. The hinge 109 may function as a detachable hinge through use of a removable pin 111 such that the removable hinge pin 111 may be inserted to form a hinge and couple the side member 103 to the wall plate 110. When the removable pin 111 is removed, the hinge 109 is disestablished such that the side member 103 is uncoupled from the wall plate 110. The presence of the hinge 109 allows the mounting frame 100 to pivot in and out of the window frame opening, whether the frame is attached to the interior or exterior of the structure, without having to completely remove the mounting frame 100 from the window frame or the wall plates 108 and 110 from the structure. This allows egress from the window in time of emergency by pivoting the mounting frame 100, with or without an AC unit installed, away from the window frame opening so an individual can exit the window without having to completely remove the AC unit or mounting frame from the window frame.

The apparatuses and processes of reversibly attaching the mounting frame 100 to the interior or exterior walls via the facing locking plates 400 will be described in greater detail below. The facing locking plate 400 on the side member 102 is shown as being coupled to the middle portion of the side member 102. However, this is only exemplary and the facing locking plate 400 may be coupled in any position along the side member 102. In addition, side member 102 may include more than one facing locking plates 400.

The bottom member 105 may be coupled to a rear security platform 200 and/or front security platform 112 as will be described in greater detail below. The bottom member 105 (in combination with the optional rear security platform 200 and/or optional front security platform 112) may sit or rest on top of the sill of the window when the mounting frame 100 is mounted within the window. The bottom member may also comprise a wheel or other component configured to reduce friction between the mounting frame and the windowsill as the frame is pivoted in and out of the window opening. In some embodiments, the bottom member may sit just above the windowsill so there is a gap between the bottom member and the windowsill to reduce potential friction between the bottom member 105 and the windowsill when the frame is pivoted in and out of the window opening.

Figure 2:
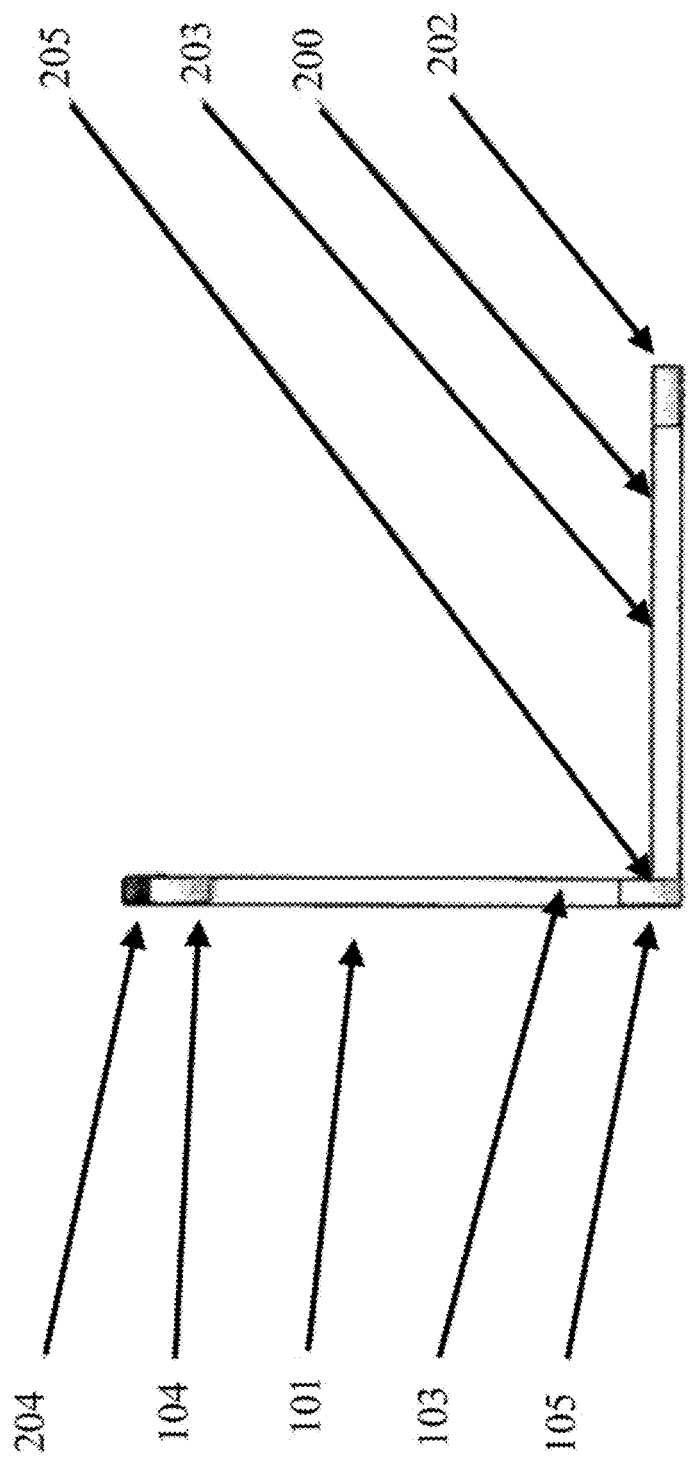
FIG. 2 is a side view of an exemplary embodiment of the secured mounting frame according to various embodiments described herein.

FIG. 2 shows a side view of an exemplary embodiment of the secured mounting frame 100 according to various embodiments described herein. The mounting frame 100 includes the front-facing flange 101 and the rear security platform 200. The front-facing flange 101 comprises side members, one of which is depicted in the FIG. 103, the top member 104 and the bottom member 105. The top member 104 is shown as including an L-shaped stability bar 204. In the embodiment shown in FIG. 2, the rear security platform 200 may be attached, either permanently fitted (e.g., welded, one integral piece, fixed hinge, etc.) or by detachable means (e.g., a friction fit, screwed, removable hinge etc.) at a base joint connection 205 to the bottom member 105. An embodiment of the mounting frame 100 would have the rear security platform 200 secured by hinge so that it may be in a resting open position to receive and support an AC unit as well as a closed upright position to cover and secure the opening 106 in the front-facing flange 101. When the rear security platform 200 is in the closed/up-right position it may be secured by any fastening device, including hooks to the mounting frame 100. The rear security platform 200 protrudes from the bottom member 105 such that when the mounting frame 100 is mounted to a window, at least a portion of the rear security platform 200 is exterior to an outer wall of the dwelling. The rear security platform 200 is to support and further stabilize the unit.

Figure 3:
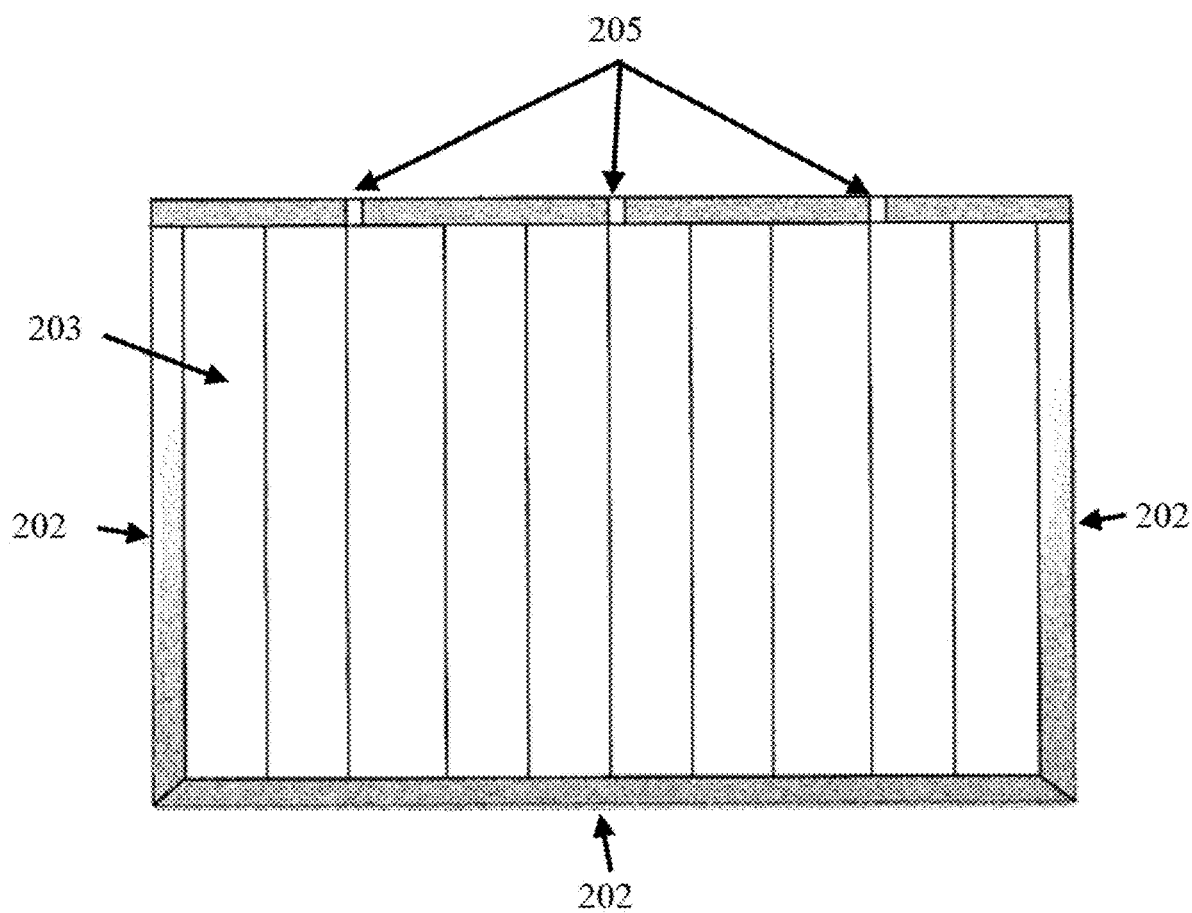
FIG. 3 is a top view of an exemplary embodiment of a rear security platform of the mounting frame according to various embodiments described herein.

FIG. 3 shows a top view of an exemplary embodiment of the rear security platform 200 of the mounting frame 100 according to various embodiments described herein. The area 205 of the rear security platform 200 is where the rear security platform 200 is coupled (either permanently fitted e.g., welded, one integral piece, fixed hinge etc. or by detachable means e.g., a friction fit, screwed, removable hinged etc.) to the bottom member 105 of the front-facing flange 101 (not shown). The rear security platform 200 extends back to a collapsible rear edge 202 at an opposite side from the front-facing flange 101. This collapsible rear edge 202 would be included in at least a portion of the rear security platform 200 that is exterior to the outer wall of the dwelling. Those skilled in the art will understand that the area of the rear security platform 200 that is exterior to the dwelling is dependent upon the depth of the window opening in the wall of the dwelling. The rear security platform 200 also includes a body portion 203. An upper surface of the body portion 203 is configured to receive the AC unit when it is inserted into the mounting frame 1. That is, the AC unit will rest on the upper surface, thereby preventing the AC unit from hanging suspended out of the window. In this example, the body portion 203 is a continuous piece of material (e.g., steel, composite, etc.). However, the body portion 203 is not required to be continuous, e.g., the body portion 203 may include slats having openings between the slats, holes, etc. The openings or holes may allow any rain or other precipitation from gathering in the mounting frame 100. As mentioned above, at least a portion of the rear security platform 200 is exterior to the outer wall of the dwelling and will be subject to the elements. An embodiment of the mounting frame 100 will allow the rear security platform 200 to fold closed and be securely fastened to the front-facing flange 101. This allows for securely closing the opening 106 for the AC unit to prevent elements from entering the dwelling or for easy storage.

Figure 4:
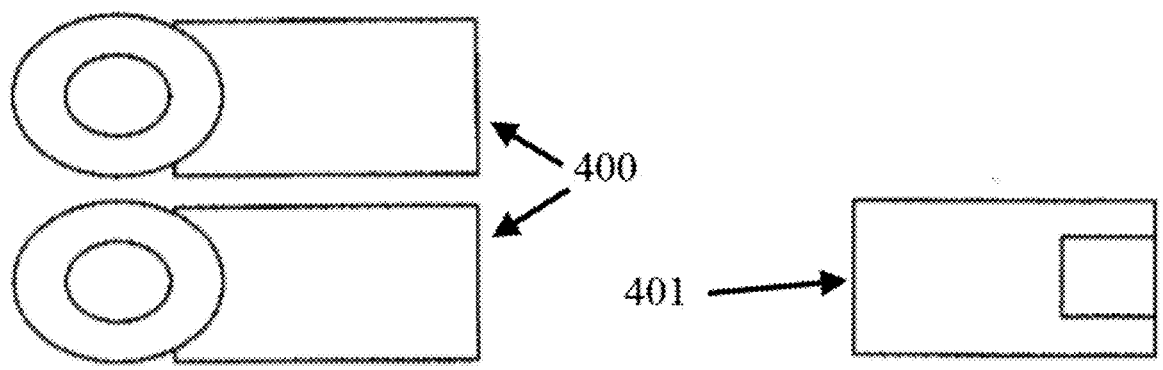
FIG. 4 shows a reversible securing mechanism that may be used to reversibly attach or secure the mounting frame according to various embodiments described herein.

FIG. 4 shows exemplary locking apparatuses 400 and 401 for connecting the facing locking plates 400 or 401 that can be included on the side member 102 and wall plate 108. Those skilled in the art will understand that the locking plates may be of varying shapes and sizes, including oval 400 and square 401. The locking plate connection securely, and reversibly, fastens the body of the mounting frame 100 to the interior or exterior of the building. In this example, the facing locking plates 400 or 401 present on the side member 102 and the wall plate 108 comprise an eyelet, but the locking plates may take other forms. Additionally, many other methods and embodiments of fastening may be applied to reversibly secure the mounting frame 100 to the dwelling structure, such as connecting the wall plate 108 to the closest wall stud, or by means of a stud and hook connection.

Figure 5:
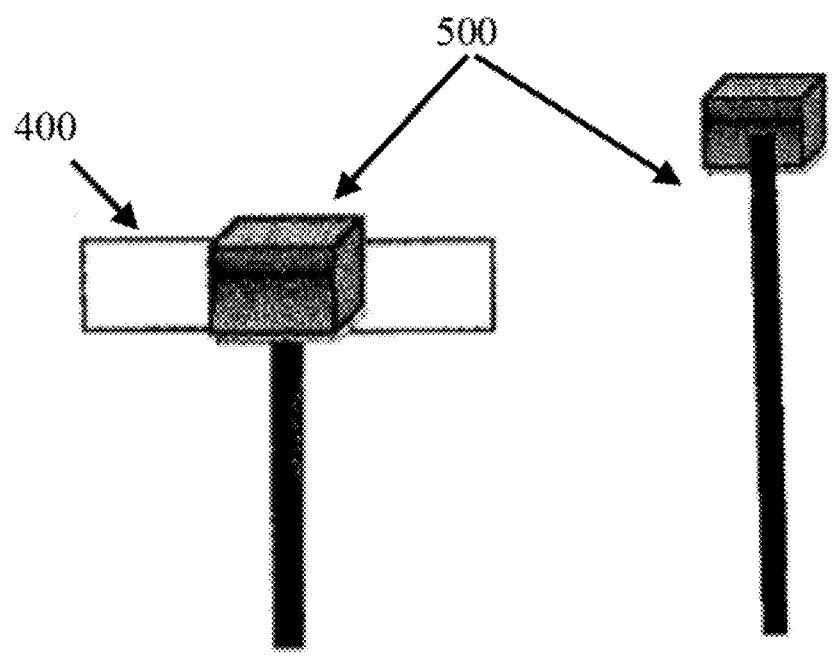
FIG. 5 shows an exemplary embodiment of locking pins that can be used in a reversible securing mechanism for reversibly attaching or securing the mounting frame according to various embodiments described herein.

FIG. 5 shows exemplary locking pin 500, and the exemplary locking pin 500 engaged in the exemplary facing locking plates 400 present on the side member 102 and the wall plate 108. The facing locking plates 400 present on the side member 102 and the wall plate 108 are reversibly connected and secured by the locking pin 500. The locking pin 500 is inserted through both the facing locking plates 400 present on the side member 102 and the wall plate 108 to reversibly secure the mounting frame 100 to the inside or outside of the dwelling without placing all the tension of the mounting frame 100 on the window and window frame. The components and mechanism for fastening the mounting frame 100 to the wall plate is configured to assure that the mounting frame 100 is supported by the connection of the fastening the plates to the structure.

Figure 6:
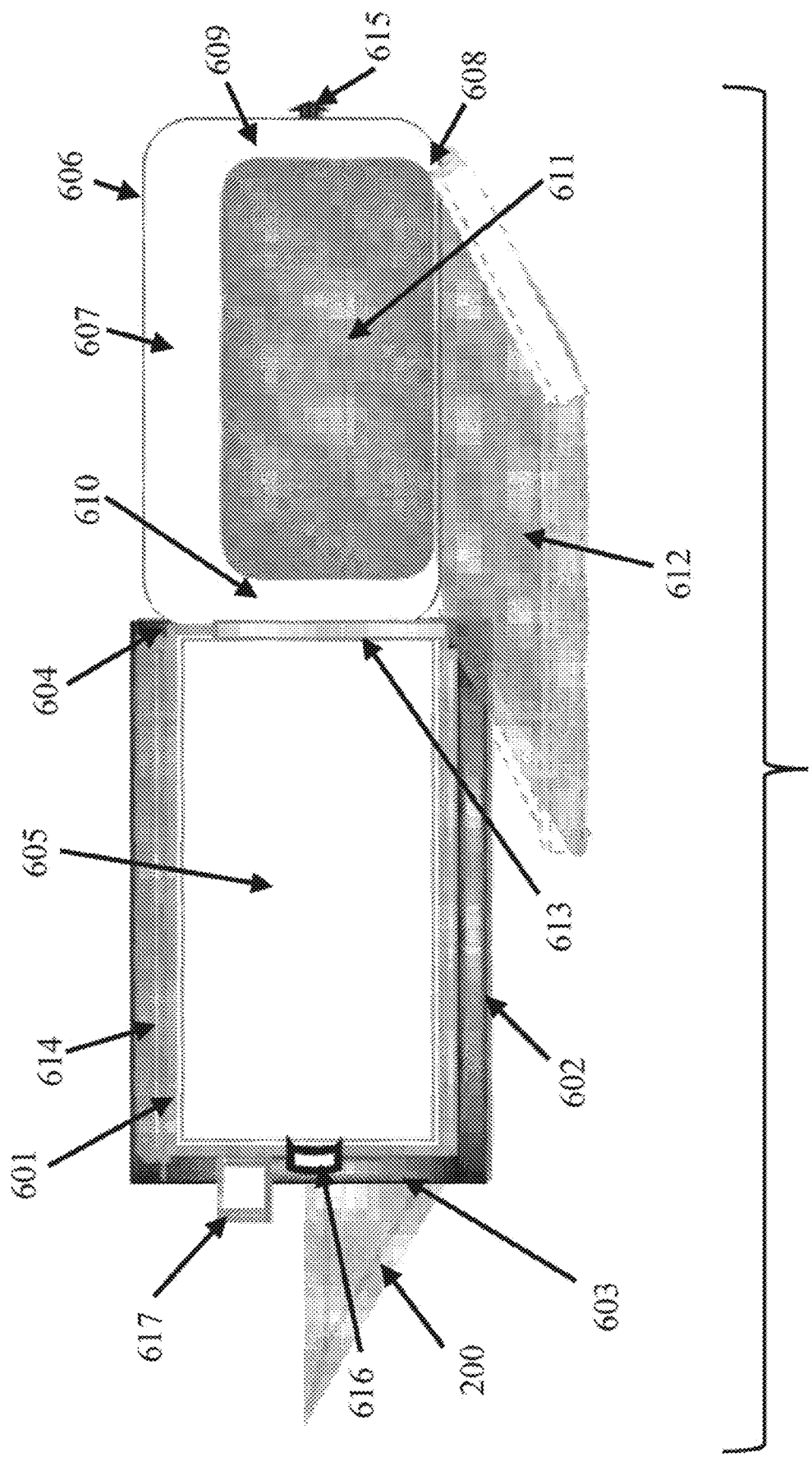
FIG. 6 shows an exemplary embodiment of a mounting frame for an air conditioning unit according to various embodiments described herein.

FIG. 6 shows a front view of another exemplary embodiment of a securing mounting frame 600 for an AC unit according to various embodiments described herein. The components of the mounting frame 600 that will be described in greater detail below may be constructed of any type of material. Exemplary materials include plastics, wood, fiberglass, metals, alloys, composite, or any other rigid and sturdy materials. Different components of the mounting frame 600 may be constructed of the same or different materials.

The secured mounting frame 600 comprises a top member 601, a bottom member 602, and two side members 603 and 604. The members 601-604 of the mounting frame 600 form an opening 605. One or both of the side members of the mounting frame 603 and 604 may comprise one or more components 617 (e.g., a plate) for attaching the mounting frame to the interior or exterior wall adjacent to the window frame. The mounting frame may also have an expandable and collapsible member (e.g., a bar or a track) attached to the bottom member 602 of the mounting frame that is configured to allow the mounting frame to be attached to the interior or exterior wall below the window frame. The expandable and collapsible member can be lengthened or shortened to accommodate window frames and surrounding structures of various shapes and sizes. The mounting frame 600 also comprises a front-facing flange 606 that is comprised of a top member 607, a bottom member 608, and two side members 609 and 610 (which may be joined to form one contiguous piece). The opening in the mounting frame 605 is configured to receive the front-facing flange 606. The members 607-610 of the front-facing flange 606 form an opening 611 that is configured to receive a window AC unit. The opening in the mounting frame 605 and the opening in front-facing flange 611 may be rectangular and the sizes may vary to fit different sizes of window openings and different sizes of window AC units. However, it should be understood that the mounting frame 600, the front-facing flange 606, and/or the opening in the mounting frame 605 and opening in the front-facing flange 611 may comprise any shape that can fit within the dimensions of a window and which can accommodate window AC units. For example, while it is common that windows are generally rectangular or square, there are instances where windows are different shapes, e.g., circular, semicircular, etc. The mounting frame 600 and front-facing flange 606 may be shaped to be received into these other shapes of windows. For example, if the window to receive the AC unit were circular, the mounting frame 600 and the front-facing flange 606 may be circular such that the mounting frame 600 may fit into the circular window. In such an example, those skilled in the art will understand there would be no side members 603 and 604 in the mounting frame or side members in the front-facing flange 609 and 610, or top and bottom members of the mounting frame 601 and 602 and front-facing flange 607 and 608, but rather a rounded mounting frame and rounded front-facing flange that both comprise generally circular perimeter members. The opening in the front-facing flange 611 that receives the AC unit in such an example could also be circular or it could also be rectangular. The opening in the front-facing flange 611 may be filled in with expandable panels (described in greater detail below) to fill in the area from the perimeter of the AC unit to the perimeter of the opening 611 in the front-facing flange, regardless of the shape of the AC unit. These examples are provided to illustrate that while the exemplary secured mounting frame 600 and front-facing flange 606 are shown as having a generally rectangular shape with generally rectangular openings 605 and 611, the rectangular shape is not a requirement and the members of the mounting frame 601-604 and members of the front-facing flange 607-610 are merely exemplary for the exemplary rectangular shapes.

The top member of the mounting frame 601 may further comprise a handle 614 and an L- or U-shaped stability bar. The handle 614 may be used to hold or carry the mounting frame 600 when installing or removing, temporarily, permanently, or long term for storage, the mounting frame 600. The stability bar may be used to help secure the mounting frame 600 to the window. For example, if the window is a typical double or single hung sash window (e.g., where there is one or two movable frames that form the window) and the mounting frame 600 is mounted within an opening of the window, one of the movable frames may be moved down to engage the stability bar so that the backside of the stability bar (in the case of the stability bar having the L-shape) rests against a front or back side of the window frame. In the case of the stability bar having a U-shaped stability bar, the window frame may be moved down to be inserted into the channel formed by the U-shape of the stability bar. Frame fastening (e.g., screw) holes may be present in the top member 601 of the mounting frame and/or may also be along the side members 603 and 604 and bottom member 602 of the mounting frame to attach the mounting frame to the window and/or window frame, but such attachment is not required. In addition, fastening (e.g., screw) holes may also be present in one or more of the top member 607, bottom member 608, and side members 609 and 610 of the front-facing flange 606 for fastening the AC unit to the front-facing flange 606, but such attachment is not required. That is the AC unit will not be fastened to the window itself, but rather the AC unit may be fastened to the front-facing flange 606 or may sit in the mounting frame 600 without being attached with the aid of optional security platforms 200, 612, and/or equivalent to 112 as described further below.

The side members of the front-facing flange 609 and 610 may also include hook holes to fasten the optional security platforms 200 and/or 612 to the front-facing flange 606. The hook holes (and corresponding hooks) may be used to secure the optional rear security platforms 200 and/or 612 and any optional front security platform (not shown in FIG. 6, but equivalent to 112 in FIG. 1) by connecting with the security platform hooks when it is in an upright position to fill partially or entirely the opening for the AC unit 611 in the front-facing flange 606. The optional rear security platform 200 may be coupled either through being permanently fitted (e.g., welded, one integral piece, fixed hinge, etc.) or by detachable means (e.g., a friction fit, screwed, removable hinge etc.), to the bottom member 602 of the mounting frame 600. The optional rear security platform 612 may be coupled either through being permanently fitted (e.g., welded, one integral piece, fixed hinge, etc.) or by detachable means (e.g., a friction fit, screwed, removable hinge etc.), to the bottom member 608 of the front-facing flange 606. The optional front security platform (not shown in FIG. 6, but equivalent to 112 in FIG. 1) may be coupled, either permanently fitted (e.g., welded, one integral piece, fixed hinge, etc.) or by detachable means (e.g., a friction fit, screwed, removable hinge etc.), to the bottom member 608 of the front-facing flange 606. One of the side members, for example 609, of the front-facing flange 606 may include a securing apparatus 615, for example eyelets and a locking pin 500, a latch, or other mechanism as described herein and known to those skill in the art to reversibly attach the front-facing flange 606 to a side member, for example 603, of the mounting frame by reversibly engaging a receiving mechanism 616 coupled to the side member 603. The other side member of the front-facing flange, for example 610, may include one or more hinges 109 or 613, for example a detachable hinge, that couples the side member 610 of the front-facing flange to a side member, for example 604, of the mounting frame. The one or more hinges 109 or 613 may function as a detachable hinge through use of a removable pin 111 such that the removable hinge pin 111 may be inserted to form a hinge and couple the side member of the front-facing flange 610 to the side member of the mounting frame 604. When the removable pin 111 is removed, the detachable hinge 109 or 613 is disestablished such that the side member of the front-facing flange 610 is uncoupled from the side member of the mounting frame 604. The presence of the one or more hinges 109 or 613 allows the front-facing flange 606 to pivot in and out of the opening 605 in the mounting frame 600 without having to completely remove the mounting frame 600 from the window frame or and/or without having to remove an AC unit installed in the opening of the front-facing flange 611. This allows egress from the window in time of emergency by pivoting the front-facing flange 606, with or without an AC unit installed, away from the window frame opening so an individual can exit the window without having to completely remove the AC unit or mounting frame from the window frame. The bottom member of the front-facing flange 608 may contact the bottom member of the mounting frame 602 or the bottom member of the front-facing flange 608 may sit above the bottom member of the mounting frame 602 with a gap between the bottom members to reduce potential friction between the bottom member of the front-facing flange 608 and the bottom member of the mounting frame 602 when the front-facing flange 606 is pivoted in and out of the opening in the mounting frame 605. The bottom member of the front-facing flange may also comprise a wheel or other component configured to reduce potential friction between the bottom member of the front-facing flange 608 and the bottom member of the mounting frame 602 when the front-facing flange 606 is pivoted in and out of the opening in the mounting frame 605.

The apparatuses 615 and 616 and processes of reversibly attaching the side member 609 of the front-facing flange to the side member of the mounting frame 603 may be any of those reversibly attaching mechanisms described herein and know to those skilled in the art. The facing apparatuses on the side members of the mounting frame 603 and front-facing flange 609 are shown as being coupled to the middle portion of the side members. However, this is only exemplary and the apparatuses may be coupled in any position along the side members. In addition, the side members 603 and 609 may include more than one reversibly attaching apparatuses.

The bottom member of the mounting frame 602 may be coupled to a rear security platform 200 and/or a front security platform (not shown in FIG. 6 but equivalent to 112 in FIG. 1). In addition, the bottom member of the front-facing flange 608 may be couple to a rear security platform 612 and/or a front security platform (not shown in FIG. 6 but equivalent to 112 in FIG. 1). The bottom member of the mounting frame 602 (in combination with the optional rear security platform 200 and/or front security platform 112) may sit or rest on top of the sill of the window when the mounting frame 600 is mounted within the window or may sit just above the sill of the window. The optional rear security platform 612 may sit or rest on top of the optional rear security platform 200 coupled to the bottom member of the mounting frame 602 or may sit just above the bottom member of the mounting frame 602 to minimize potential friction between the rear security platform 612 and the rear security platform 200 when the front-facing flange 606 is pivoted in and out of the opening in the mounting frame 605. The optional front security platform 112 coupled to the bottom member of the front-facing flange 608 may sit just above the bottom member of the mounting frame 602 and the sill of the window to minimize potential friction between the front security platform 112 and the bottom member of the mounting frame 602 and windowsill when the front-facing flange 606 is pivoted in and out of the opening in the mounting frame 605.

Figure 7:
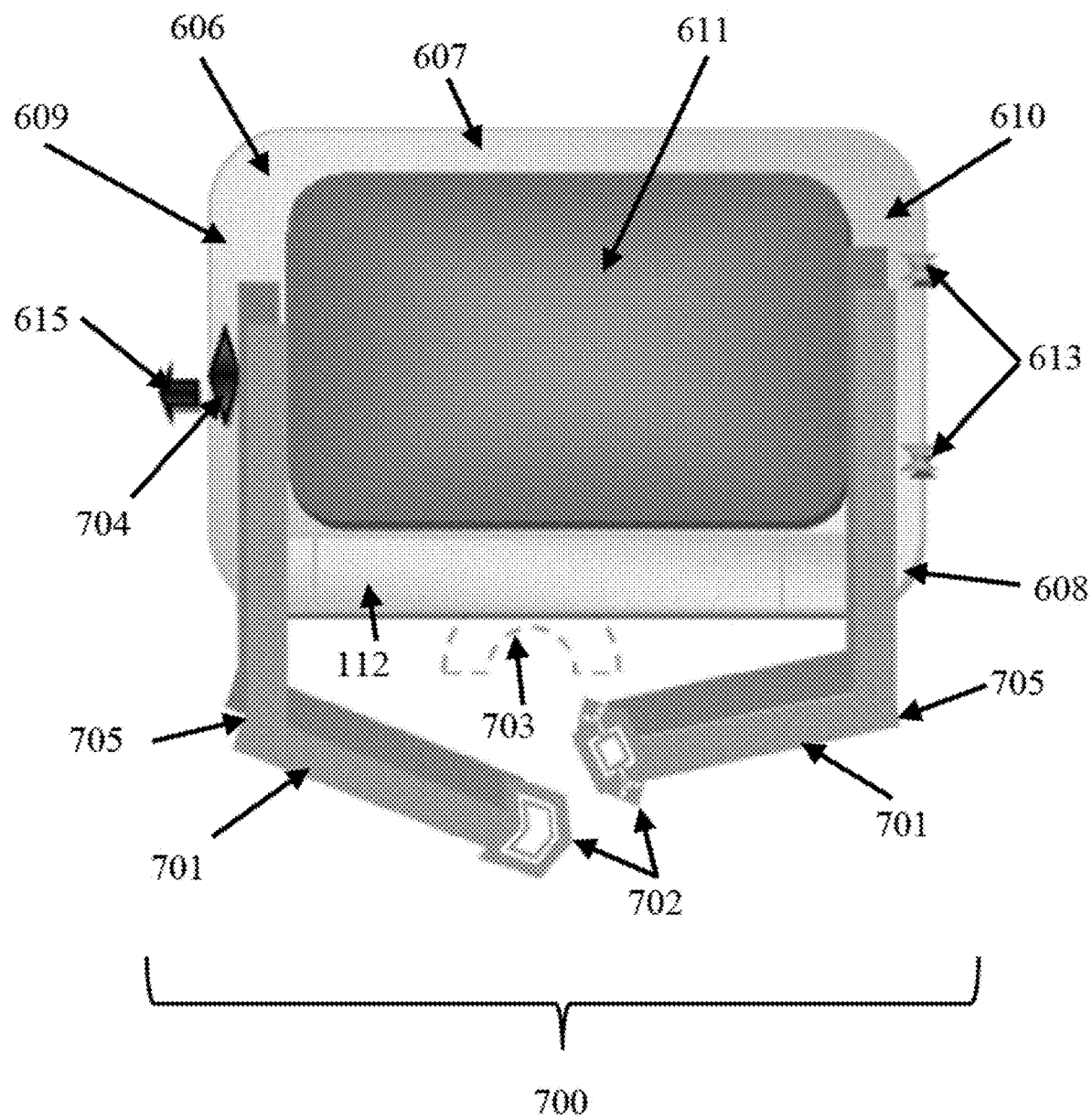
FIG. 7 shows an exemplary embodiment of a mounting frame for an air conditioning unit according to various embodiments described herein.

FIG. 7 shows another exemplary embodiment of a securing mounting frame 700 according to various embodiments described herein. The device shown in FIG. 7 is similar to the device in FIG. 6, however it further comprises adjustable arms 701, configured to prevent the air conditioning unit from sliding forward and out of the opening 611 in the front-facing flange 606. The arms 701 may be coupled to the side members 609 and 610 of the front-facing flange 606. The arms 701 may have joints 705 to allow the arms to bend and form a fence or guard around the front of an AC unit. The arms 701 may be configured to reversibly couple to one another through a reversibly locking mechanism 702 to secure the front of the air conditioning unit in the opening 611 in the front-facing flange 606. The optional front security platform 112 may comprise a bar brace 703 that is coupled to the platform and is configured to support the platform by forming a brace between the platform and the structure below the window opening. The front-facing flange 606 may also have a handle 704 to facilitate pivoting the front-facing flange in and out of the opening in the mounting frame 605.

Figure 8:
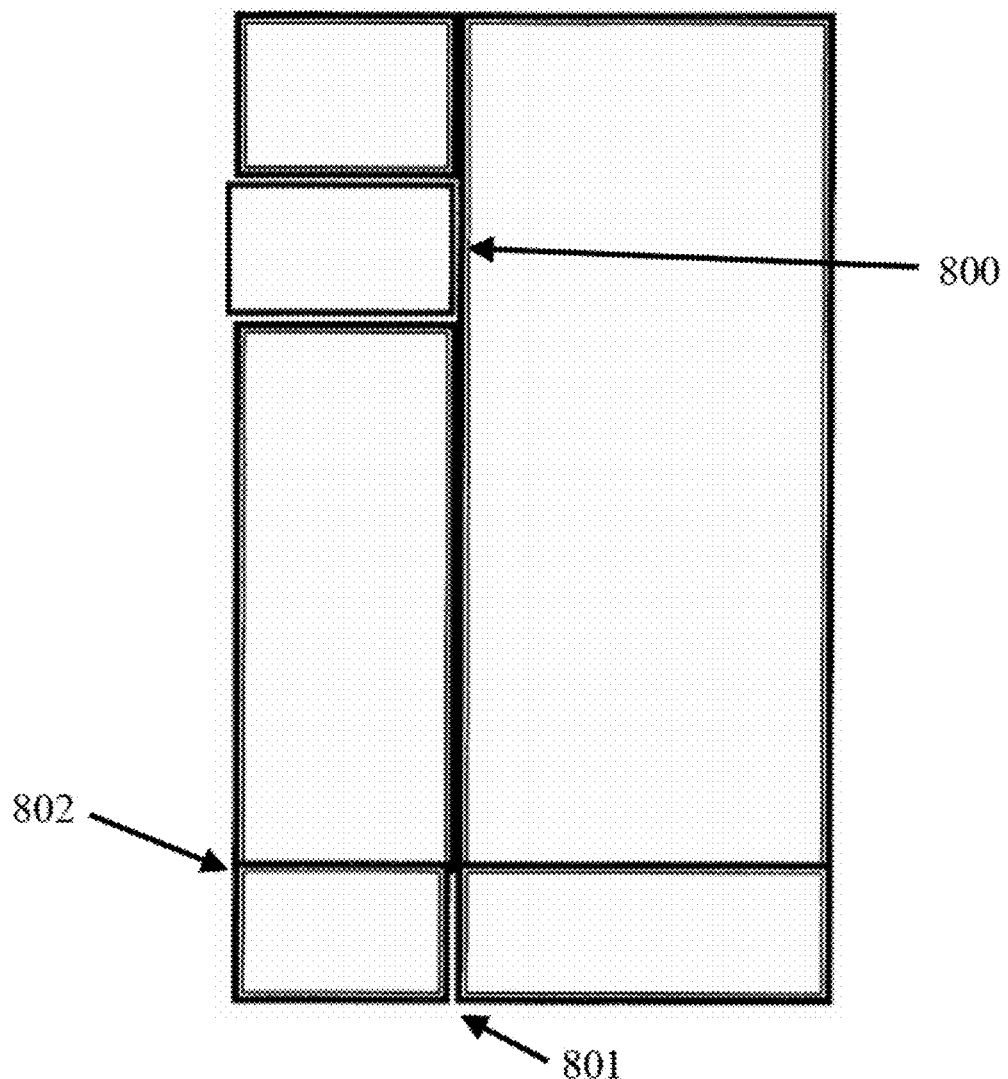
FIG. 8 is a front view of an expandable panel for use with the mounting frame unit according to various embodiments described herein.

FIG. 8 shows an exemplary embodiment wherein portions (e.g., side members) the mounting frame 100, 600, or 700 may be expanded by the means of expandable panels to fill in and cover unwanted gaps in openings, for example, 106 and 611. In such an embodiment, expandable panels may be added to side members 102, 103, 609, and 610, top member 104 and 607, and/or bottom member 105 and 608 of the front-facing flange 101 and 606. The expandable panels may be connected by means of a groove and tongue snap lock 800 into notches 801 on side members 102, 103, 609, and 610, top member 104 and 607, and/or bottom member 105 and 608. Expandable panels may have expandable slide portions 802. The expandable panels allow a user to fill the excess space left in the opening 106, 611 of the front-facing flange 101, 606 when the air conditioning unit does not fit the entire opened space 106, 611. The expandable panels can vary in size, shape, and thickness. The expandable panels may also vary to fit around various shaped air conditioning units. The expandable panels may be used in however many multiples and combinations of types that are needed to fill the excess space. The expandable panels may be connected to other panels by means of a grooved male tongue snap lock 800 into notches 801 or screwed or hooked to the mounting frame or air conditioner. An embodiment of mounting frame 100, 600, 700 would have the expandable panels coupled to the side members 102, 103, 609, and/or 610 for easy deployment.

Figure 9:
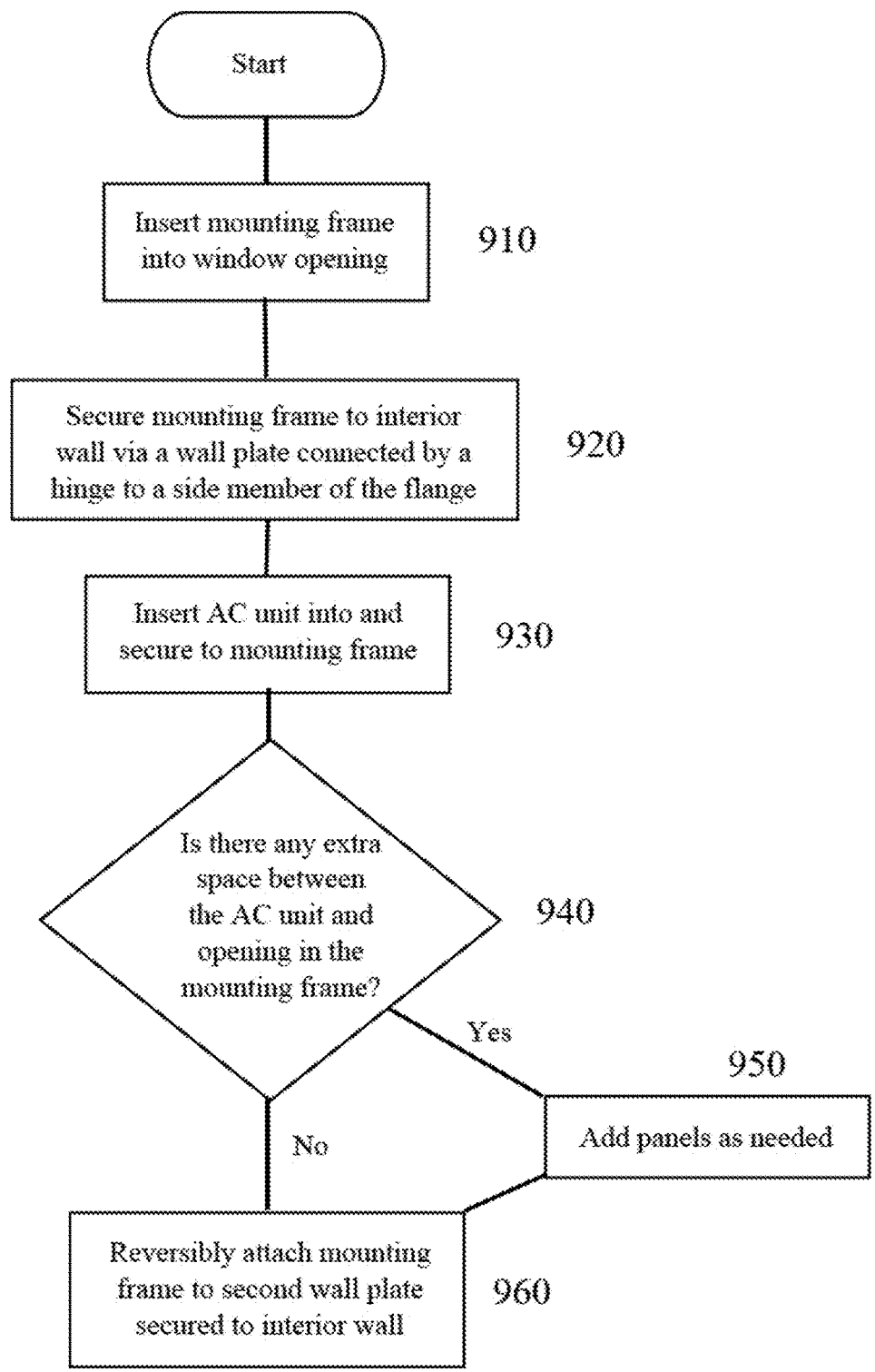
FIG. 9 is a method for installing the mounting frame for an air conditioning unit described herein.

FIG. 9 shows a flow chart showing an exemplary method for AC unit installation using the mounting frame 100 (similar methods may be used for installing mounting frames 600 and 700 and others described herein, wherein steps may be added, omitted, or modified as would be understood by those skilled in the art to allow successful installation). In step 910, a user inserts the mounting frame 100 into the window opening making sure that the rear security platform 200 is facing outside the window. In step 920 the user then secures the mounting frame 100 to the interior or exterior wall using the wall plate 108 and locking pin 500 in the locking plates 400 or 401 located on one side member 102 and wall plate 108 and also using wall plate 110 and detachable hinge 109 on the other side member 103. In step 930, the user installs the air conditioning unit into the opening 106 of the front-facing flange 101 of the mounting frame 100 and optionally secures the frame to the AC unit by means of inserting screws into the screw holes on the front-facing flange 101 or by another suitable fastener. In optional step 940 the user then has the option to use the expandable panels if there is excess space and they are needed or be finished with method. In step 950 the user has opted to add or utilize the expandable panels to the mounting frame 100 and adds them as needed before completing the method for AC unit installation. In optional step 960 the user reversibly attaches side member 102 of the frame to wall plate 108 secured to the interior or exterior wall.

Figure 10:
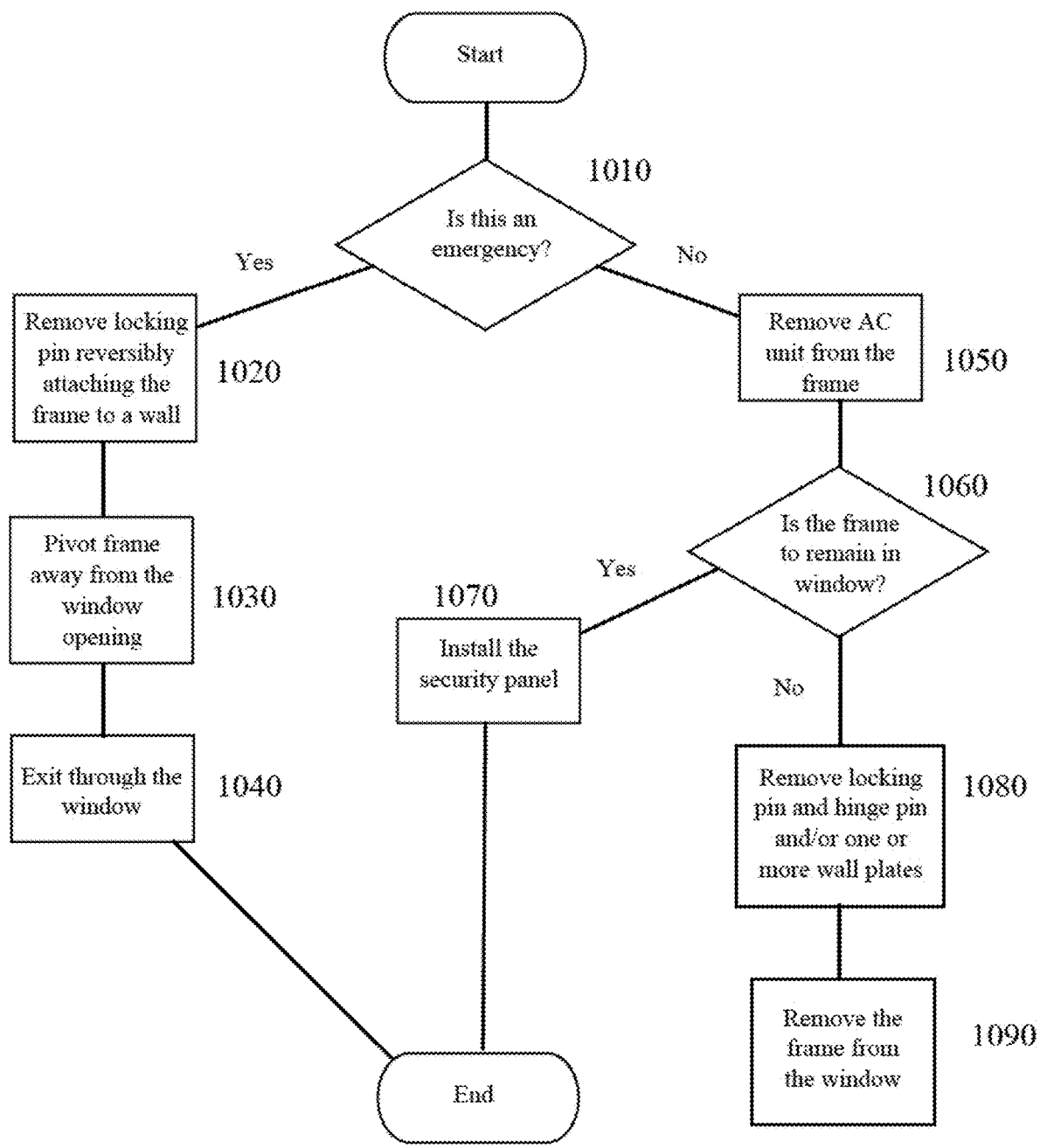
FIG. 10 is a method for pivoting the mounting frame for an air conditioning unit out of a window frame to allow access to the window or a method for removing the mounting frame described herein.

FIG. 10 shows a flow chart for an exemplary method of AC unit removal from the mounting frame 100 or removal of the frame or pivoting of the front-facing flange 606 as appropriate to allow egress through the window (similar methods may be used for mounting frames 600 and 700 and others described herein, wherein steps may be added, omitted, or modified as would be understood by those skilled in the art to allow successful AC unit removal and/or egress). In step 1010, the option is given to determine if the removal is under an emergency situation such as fire. In the case of an emergency a user in step 1020 would remove locking pin 500, or other reversible fastener as described herein, and in step 1030 pivot the mounting frame 100 and optionally installed AC unit away from the window opening, which pivoting is enabled by to the presence of the detachable hinge 109, to allow access to the window opening without having to remove or uninstall the mounting frame 100 and/or AC unit. In step 1040 the user exits through the window to avoid the emergency within the dwelling, optionally utilizing a component for egress optionally coupled to the device or windowsill to facilitate egress as described further herein. In step 1050, there is no emergency, and the user removes the AC unit from the rectangular opening 106 by undoing the fastening on the front-facing flange 101 of the mounting frame 100. In step 1060 the user decides whether to remove the mounting frame 100 or let it remain in the window. In step 1070, the user chose to let the mounting frame 100 remain in the window and pulls in the security platform 200 to seal the opening 106. In step 1080, the user chose to remove the mounting frame 100 from the window and removes the locking pin 500, or other reversible fastener as described herein, and removable hinge pin 111 and/or wall plates 108 and 110. In step 1090, the user removes the frame from the window opening.

Figure 11:
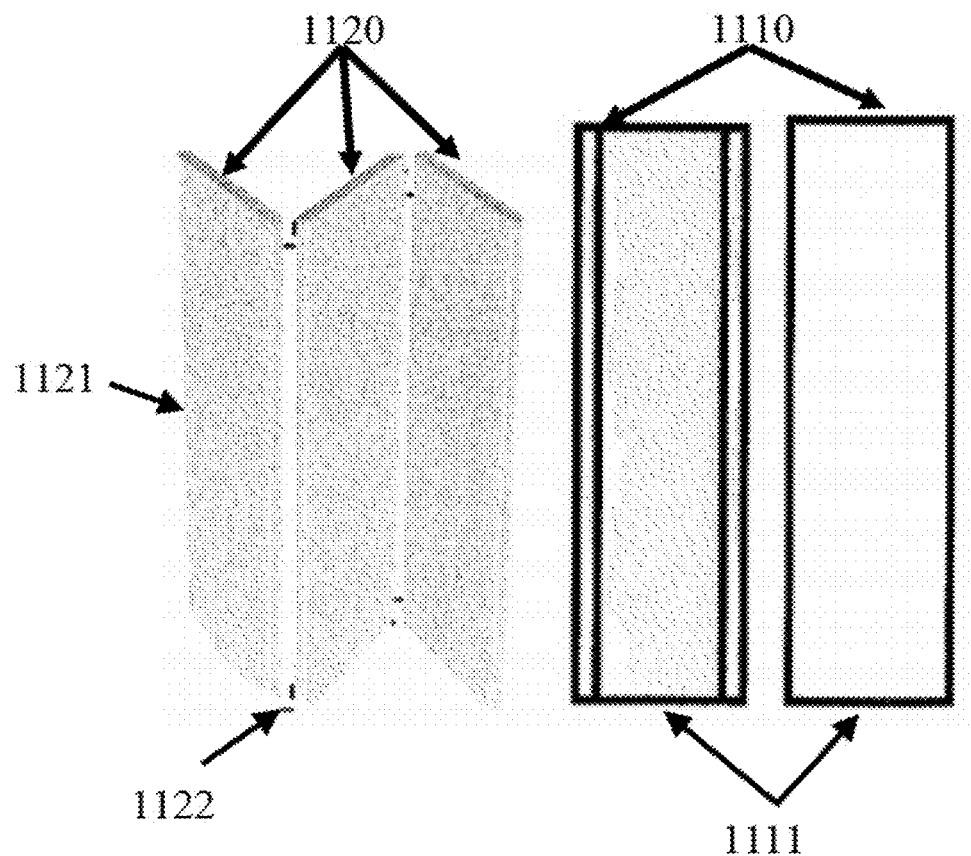
FIG. 11 shows an exemplary embodiment of expandable panels that can be used with the mounting frames described herein.

FIG. 11 shows expandable panels that may be coupled to the side members 102, 103, 609, and/or 610 of the mounting frames 100, 600, or 700 so that the expandable panels may easily be deployed to fill in any excess space in the opening of front-facing flange 106 or 611 when the AC unit is installed. The expandable panels may be of the sliding 1110 or folding sort 1120. The folding panels 1121 would expand in an accordion manner along folding points 1122 from one or more of the side members 102, 103, 609, and 610 inwards to meet the AC unit. The folding panels 1121 would stack up and be stowed when not in use. The sliding panels 1111 slide from the one or more side members 102, 103, 609, and 610 inwards toward the AC unit. Both methods of attached expandable panels may also be applied to the top members 104 and 607 and/or bottom members 105 and 608.

Figure 12:
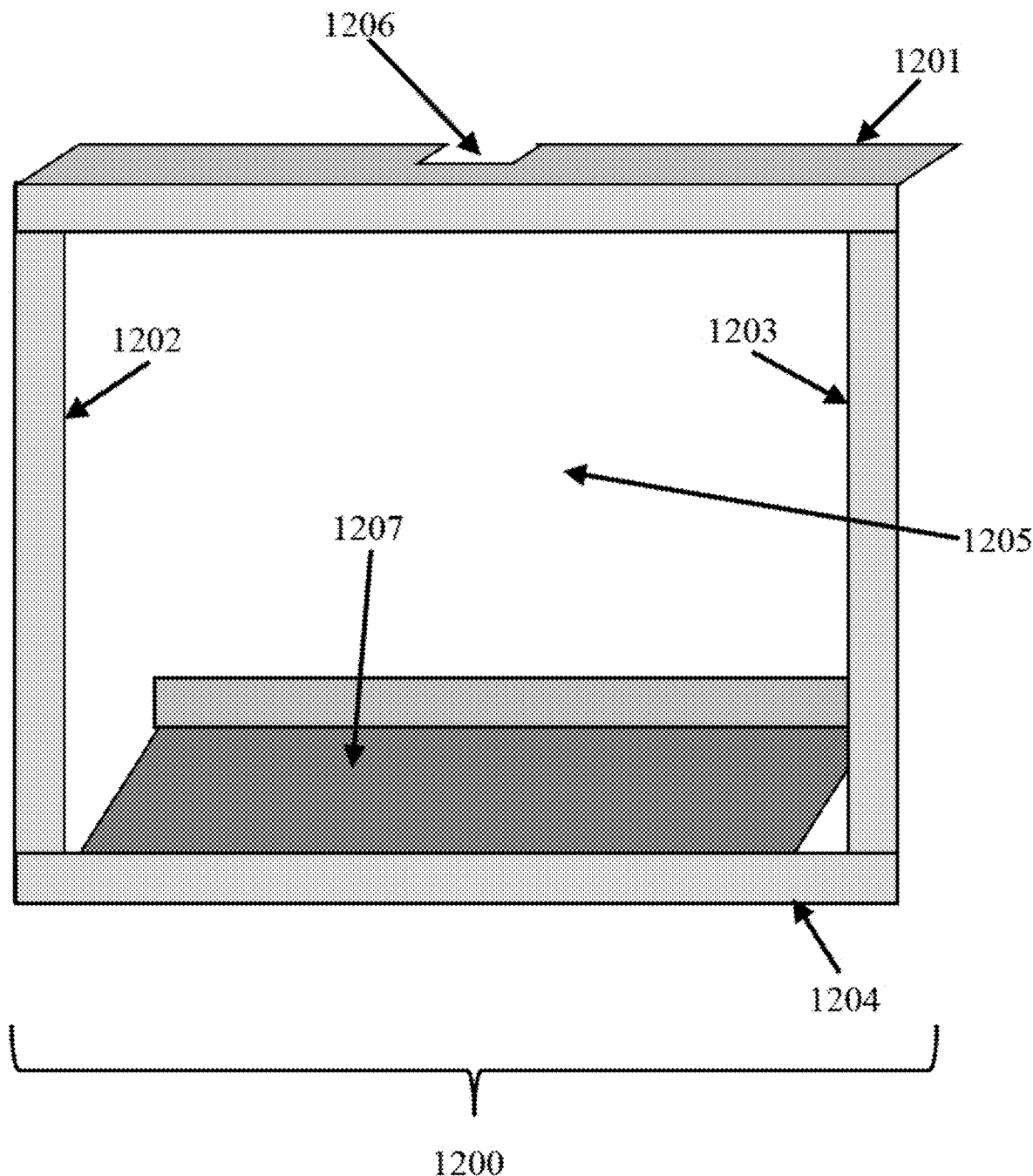
FIG. 12 is a front view of an exemplary embodiment of a device for securing a window optionally having an air conditioning unit installed according to various embodiments described herein.
Figure 13:
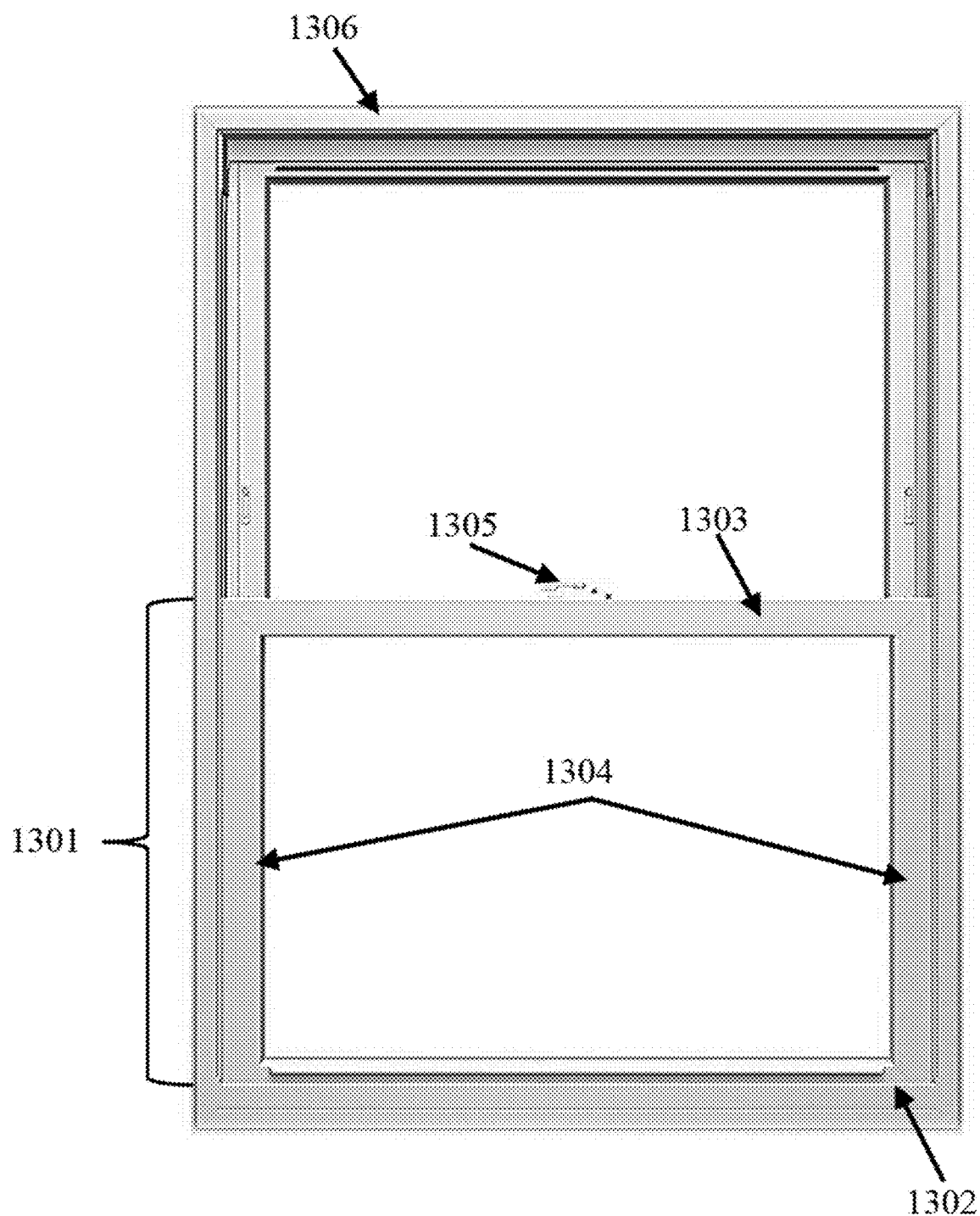
FIG. 13 is a front view of an exemplary window in which the mounting frame and/or window securing device according to various embodiments described herein may be used.
Figure 14:
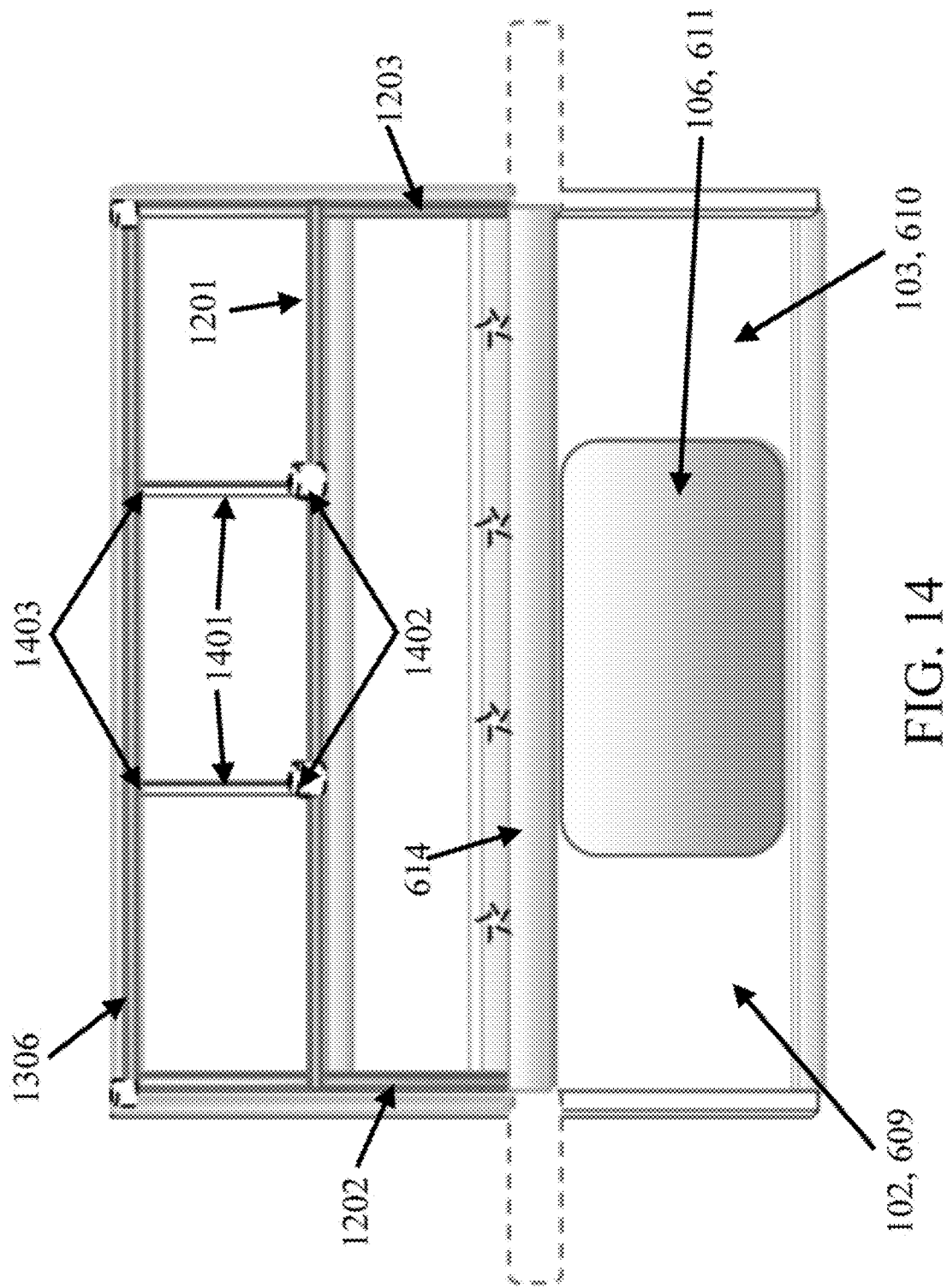
FIG. 14 is a front view of an exemplary embodiment of the combination of an exemplary embodiment of a mounting frame for an air conditioning unit according to various embodiments described herein and an exemplary device for securing a window optionally having an air conditioning unit installed according to various embodiments described herein.

Exemplary embodiments of a device for securing a window, including embodiments in which an air conditioning unit is installed in the window, may be further understood with reference to the drawings, in particular FIGS. 12-14, and the following description, wherein like elements in the drawings are referred to with the same reference numerals. Exemplary embodiments describe a device, which provides a frame and additional components for securing a window, including securing a window having an air conditioning unit installed.

FIG. 12 shows an exemplary embodiment of a window securing device as described herein. FIG. 13 shows the anatomy of an exemplary window and its components as referenced herein. The exemplary window securing device 1200 shown in FIG. 12 comprises a top member 1201 and two side members 1202 and 1203. The exemplary window securing device further comprises an optional bottom member 1204. The exemplary window securing device 1200 forms a frame with an opening 1205, a portion of which fits over the lower sash of a window 1301 and a portion of which fits over a portion of the front of a window air conditioning unit. The side members 1202 and 1203 and the optional bottom member 1204 of the window securing device 1200 may contact the sill of the window 1302.

The top member 1201 of the exemplary window securing device 1200 may be L-shaped so the top member 1201 contacts the upward facing portion of the top rail 1303 of the lower sash of the window 1301 and also inward facing portion of the top rail 1303 of the lower sash of the window 1301. The side members 1202 and 1203 of the exemplary window securing device 1200 contact the inward facing portion of the stiles 1304 of the lower sash of the window 1301. The optional bottom member 1204 of the exemplary window securing device contacts the window frame 1207 and/or windowsill 1302. In embodiments where the window securing device 1200 does not comprise the optional bottom member 1204, the side members 1202 and 1203 may contact the windowsill 1302. One or more the top member 1201, side members 1202 and 1203, and optional bottom member 1204 may be reversibly attached to the lower sash of the window 1301 via variety of fasteners, such as adhesives or screws. The top member 1201 of the exemplary window securing device 1200 comprises an opening 1206 for receiving a sash lock 1305 located on the top rail 1303 of lower sash of the window 1301.

FIG. 14 shows an exemplary embodiment of both a mounting frame 100, 600, or 700 and a window securing device 1200 installed in a window (each of which will be understood to potentially describe components designated in at least FIGS. 1, 6, and 7 even though not all components are labeled in FIG. 14). As described further herein, the window securing device 1200 may comprise one or more securing bars 1401 each having a proximal end 1402 and a distal end 1403 wherein the proximal end 1402 of the one or more security bars 1401 contacts the top member 1201 of the window securing device and a distal end 1403 of the one or more security bars 1401 contacts the head jamb 1306 of the window frame or a ceiling above the window.

FIGS. 15A-C show an exemplary embodiment of a securing mounting device and track system for an AC unit 1500 installed in a window opening. The figure shows the device in a closed (FIG. 15A), partially open (FIG. 15B), and fully open (FIG. 15C) configuration. The exemplary mounting device and track system comprises one or more tracks 1501 secured to the window frame 1502 at the tracks' distal ends 1503. In this exemplary embodiment, the tracks' distal ends 1503 are secured to the window frame by means of a plate (not pictured) attached to the window frame. Other embodiments, however, have a mounting frame with a top member, a bottom member, and two side members, and the one or more tracks' distal ends may be secured to the two side members of the mounting frame. In certain embodiments, the tracks' distal ends are secured below a platform 1504 on which an air conditioning unit may rest. In certain embodiments, the tracks are L-shaped and may support the platform 1504. The tracks 1501 may be separate units as shown in FIGS. 15A-C or connected to one another at their distal ends. It should also be understood that the portion of the tracks at 1503 and/or the one or more plates may comprise any shape that can fit within the dimensions of a window. For example, while it is common that windows are generally rectangular or square, there are instances where windows are different shapes, e.g., circular, semi-circular, etc. The tracks and/or the one or more plates may be shaped at point 1503 to align with these other shapes of windows. The tracks further comprise a sliding mechanism running from their distal end to the proximate end. In this exemplary embodiment, the sliding mechanism is configured to receive a platform 1504 on which an air conditioning unit 1500 may rest. However, in other embodiments, the sliding mechanism may optionally be configured to receive an air conditioning unit directly. The tracks 1501 may further comprise one or more mechanisms 1505 that lock the track in certain positions. The one or more locking mechanisms 1505 may be adjusted to cause the platform to stop at varying points in the tracks.

FIG. 15A shows one position in which the AC unit and platform is inside the window opening over the plate and the windowsill. This position allows an air conditioning unit placed on the platform to function normally as an air conditioning unit. The platform 1504 may reversibly engage with the tracks' distal end 1503 and/or the plate. When the platform is not engaged with the tracks, the platform 1504 may be reversibly secured to the window frame. In certain embodiments, the platform comprises one or more holes and reversibly secures to the window frame via one or more securing components, for example, eyelets and one or more locking pins. In some embodiments, the tracks' distal ends comprise one or more eyelets configured to receive the one or more locking pins. In some embodiments, the platform 1504 reversibly secures to the window frame via one or more reversible snap locks. In certain embodiments, the platform 1504 reversibly secures with the window frame via one or more hooks.

In certain embodiments, when the platform 1504 reversibly disengages with the tracks' distal end 1503 or the plate, the platform may be moved out of the window opening, at which point it engages with the sliding mechanism of the tracks 1501. The platform may then slide down the tracks via the sliding mechanism to varying points depending on the configuration of the optional locking mechanisms 1505. FIG. 15B shows one position in which the platform is stopped by the optional locking mechanisms 1505 partway down the tracks 1501. FIG. 15C shows another position in which the platform is at the bottom of the tracks 1501, fully revealing the open window frame 1506. In some embodiments, the tracks 1501 are positioned in the interior of the window and building such that the platform 1504 moves out of the window opening toward the interior of the building. In certain embodiments, the tracks 1501 are positioned in the exterior of the window and building such that the platform 1504 moves out of the window opening toward the exterior of the building. In some embodiments, the tracks 1501 extend to the ground and provide a means of egress, wherein a person may position themself on the platform 1504 as it engages the sliding mechanism. In certain embodiments, the optional locking mechanisms 1505 control the platform's 1504 range and/or rate of descent. In some embodiments, the platform 1504 slides down the tracks via the sliding mechanism to varying points depending on the configuration of the optional locking mechanisms 1505.

It will be apparent to those of ordinary skill in the art that various modifications may be made in the present inventions, without departing from the spirit or the scope of the inventions. Thus, it is intended that the present inventions cover modifications and variations of the inventions.

What is claimed is:

1. A device for securing for an air conditioning unit in a window opening, the device comprising:
   a front-facing flange comprising a top member, a bottom member, a first side member, and a second side member, wherein the front-facing flange comprises an opening configured to receive the air conditioning unit;
   a mounting frame comprising a top member, a bottom member, a first side member, and a second side member, wherein the mounting frame comprises an opening that is configured to receive the front-facing flange;
   wherein, the first side member of the front-facing flange is coupled to the first side member of the mounting frame by one or more hinges and the second side member of the front-facing flange is configured to reversibly engage the second side member of the mounting frame to secure the front-facing flange to the mounting frame when the second side member of the front-facing flange is reversibly engaged with the second side member of the mounting frame, such that the front-facing flange is configured to pivot in relation to the first side member of the mounting frame; and
   wherein, the mounting frame is configured to be installed into the window opening, and when the mounting frame is installed into the window opening, the front-facing flange is configured to receive the air conditioning unit through the opening in the front-facing flange, and upon pivoting the front-facing flange is configured to cover and uncover the window opening.

2. The device of claim 1, further comprising a security platform.

3. The device of claim 2, wherein the security platform comprises a plurality of openings.

4. The device of claim 2, wherein the security platform is coupled to one or more of the bottom member of the mounting frame and the bottom member of the front-facing flange via one or more hinges, and, in an open position, the security platform is coupled to one or more of the bottom member of the mounting frame and the bottom member of the front-facing flange and is configured to receive and support the air conditioning unit, and, in a closed position, the security platform is coupled to one or more of the bottom member of the mounting frame and the bottom member of the front-facing flange and is configured to at least partially cover the opening in the front-facing flange.

5. The device of claim 2, wherein the security platform is a rear security platform.

6. The device of claim 2, wherein the security platform is a front security platform.

7. The device of claim 1, wherein the front-facing flange further comprises:
   one or more holes for receiving a component for securing the window, wherein the component for securing the window prevents the window from opening further when the component for securing the window is inserted into the one or more holes.

8. A device for securing an air conditioning unit in a window opening, the device comprising:
   one or more tracks, each track comprising a sliding mechanism;
   a mounting component comprising a first side member and a second side member; and
   a platform;
   wherein, the one or more tracks is coupled to one or more of the first side member of the mounting component, the second side member of the mounting component, and the platform;
   wherein, the platform is configured to be inserted into at least a portion of a window frame of an open window, and when the platform is inserted into at least a portion of the window frame, the platform is configured to receive the air conditioning unit through the opening in the window;
   wherein, when the platform is inserted into at least a portion of the window opening, the platform is configured to reversibly engage with the sliding mechanism of the one or more tracks when the platform is moved away from the window opening; and upon engaging with the sliding mechanism or the one or more tracks, the platform is configured to move down the one or more tracks and uncovering the window opening.

9. The device of claim 8, wherein the one or more tracks further comprise one or more locking mechanisms configured to reversibly lock the platform in certain positions on the track.

10. The device of claim 8, wherein the mounting component further comprises a top member and a bottom member, the mounting component comprises an opening that is configured to receive the platform, and the mounting component is configured to be installed into the window opening.

11. The device of claim 8, wherein the mounting component comprises two or more separated wall plates, the two or more wall plates comprising two separated side members.

12. The device of claim 8, wherein the device further comprises a security plate coupled to the windowsill, and the platform, when at least partially installed into the window opening, rests on top of the security plate.

13. The device of claim 8, wherein the platform is configured to be reversibly secured to the window frame.

14. The device of claim 8, wherein the one or more tracks are positioned on the exterior of the window, and when the platform engages with the sliding mechanism of the one or more tracks, the platform is configured to move down the one or more tracks toward the ground, thereby providing a means of egress.

15. The device of claim 14, wherein the one or more tracks further comprise one or more locking mechanisms configured to reversibly lock the platform in certain positions on the track.

* * * * *